US012743742B2

(12) United States Patent
Pan

(10) Patent No.: US 12,743,742 B2
(45) Date of Patent: Sep. 22, 2026

(54) ILLUMINATION INFORMATION LOADING METHOD AND APPARATUS, COMPUTER DEVICE, AND STORAGE MEDIUM

(71) Applicant: Tencent Technology (Shenzhen) Company Limited, Shenzhen (CN)

(72) Inventor: Lele Pan, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 57 days.

(21) Appl. No.: 18/769,251

(22) Filed: Jul. 10, 2024

(65) Prior Publication Data

US 2024/0362742 A1 Oct. 31, 2024

Related U.S. Application Data

(63) Continuation of application No. PCT/CN2023/087275, filed on Apr. 10, 2023.

(30) Foreign Application Priority Data

Jun. 9, 2022 (CN) ......................... 202210645771.0

(51) Int. Cl.
*G06T 1/60* (2006.01)
*G06T 7/62* (2017.01)
(Continued)

(52) U.S. Cl.
CPC ................. *G06T 1/60* (2013.01); *G06T 7/62* (2017.01); *G06T 7/90* (2017.01); *G06T 15/60* (2013.01);
(Continued)

(58) Field of Classification Search
CPC .... G06T 1/60; G06T 7/62; G06T 7/90; G06T 15/60; G06T 2200/04; G06T 2207/10028;
(Continued)

(56) References Cited

U.S. PATENT DOCUMENTS

2018/0093183 A1* 4/2018 Leblanc .................. A63F 13/52
2020/0107035 A1* 4/2020 Li .......................... H04N 19/44
(Continued)

FOREIGN PATENT DOCUMENTS

CN 111508051 A 8/2020
CN 113034656 A 6/2021
(Continued)

OTHER PUBLICATIONS

Tencent Technology, ISR, PCT/CN2023,087275, Aug. 2, 2023, 2 pgs.

(Continued)

*Primary Examiner* — Chong Wu
(74) *Attorney, Agent, or Firm* — Morgan, Lewis & Bockius LLP

(57) ABSTRACT

This application relates to an illumination information loading method and apparatus, a computer device, and a storage medium, and to the field of games. The method includes: determining at least one candidate illumination information storage block, the candidate illumination information storage block being an illumination information storage block associated with a target image (202); determining a storage block weight corresponding to the at least one candidate illumination information storage block (204); and determining a target illumination information storage block from the at least one candidate illumination information storage block based on the storage block weight, and loading the target illumination information storage block, a loaded illumination information storage block being configured for performing illumination calculation to perform rendering, so as to obtain a target image (206).

17 Claims, 8 Drawing Sheets

(51) Int. Cl.
*G06T 7/90* (2017.01)
*G06T 15/60* (2006.01)

(52) U.S. Cl.
CPC .................... *G06T 2200/04* (2013.01); *G06T 2207/10028* (2013.01)

(58) Field of Classification Search
CPC ............. G06T 2210/08; G06T 2210/36; G06T 15/506; G06T 15/205
See application file for complete search history.

(56) References Cited

U.S. PATENT DOCUMENTS

| | | | | |
|---|---|---|---|---|
| 2021/0192789 | A1* | 6/2021 | Raif | G06T 7/90 |
| 2023/0360311 | A1* | 11/2023 | Ouyang | G06T 15/506 |

FOREIGN PATENT DOCUMENTS

| | | | |
|---|---|---|---|
| CN | 114119823 | A | 3/2022 |
| CN | 114419234 | A | 4/2022 |

OTHER PUBLICATIONS

Finian Mwalongo al., "Web-Based Volume Rendering using Progressive Importance-Based Data Transfer", Vision, Modeling, and Visualization (VMV), Oct. 2018, 8 pgs.

Markus Hadwiger et al., "Interactive Volume Exploration of Petascale Microscopy Data Streams Using a Visualization-Driven Virtual Memory Approach", IEEE Transactions on Visualization and Computer Graphics, vol. 18, No. 12, Dec 2012, 10 pgs.

* cited by examiner

ILLUMINATION INFORMATION LOADING METHOD AND APPARATUS, COMPUTER DEVICE, AND STORAGE MEDIUM

CROSS-REFERENCE TO RELATED APPLICATIONS

This application is a continuation application of PCT Patent Application No. PCT/CN2023/087275, entitled "ILLUMINATION INFORMATION LOADING METHOD AND APPARATUS, COMPUTER DEVICE, AND STORAGE MEDIUM" filed on Apr. 10, 2023, which claims priority to Chinese Patent Application No. 202210645771.0, entitled "ILLUMINATION INFORMATION LOADING METHOD AND APPARATUS, COMPUTER DEVICE, AND STORAGE MEDIUM" filed with the China National Intellectual Property Administration on Jun. 9, 2022, both of which are incorporated herein by reference in their entirety.

FIELD OF THE TECHNOLOGY

This application relates to the field of light rendering technologies, and in particular, to an illumination information loading method and apparatus, a computer device, and a storage medium.

BACKGROUND OF THE DISCLOSURE

With development of computer technologies and the game industry, a light rendering technology has emerged. Pictures with real illumination effects can be rendered by using the light rendering technology. For example, for pictures in a game scene, there are lights in many pictures, and the light rendering technology can be used to render a picture with an illumination effect in the game scene.

In a conventional technology, when light rendering is performed, all pre-stored illumination information is uniformly loaded into a GPU. In this way, loading all stored illumination information uniformly consumes a lot of storage space. However, in actual light rendering, it is generally not necessary to use all of the illumination information, so that redundant illumination information is loaded, causing a waste of storage resources.

SUMMARY

According to various embodiments of this application, an illumination information loading method and apparatus, a computer device, and a computer-readable storage medium are provided.

According to an aspect, this application provides a method for rendering an image performed by a computer device. The method includes: determining at least one candidate illumination information storage block associated with a target image; determining a storage block weight corresponding to the at least one candidate illumination information storage block; determining a target illumination information storage block from the at least one candidate illumination information storage block based on the storage block weight; and performing illumination calculation by loading the target illumination information storage block to render the target image.

According to another aspect, this application further provides a computer device. The computer device includes a memory and one or more processors. The memory has computer-readable instructions stored therein, and the computer-readable instructions, when executed by the one or more processors, cause the computer device to perform operations in the foregoing image rendering method.

According to another aspect, this application further provides one or more non-transitory readable storage media. The computer-readable storage media have computer-readable instructions stored thereon, and the computer-readable instructions, when executed by one or more processors of a computer device, cause the computer device to implement operations in the foregoing image rendering method.

Details of one or more embodiments of this application are provided in the accompanying drawings and descriptions below. Other features, objectives, and advantages of this application become apparent from the specification, the drawings, and the claims.

BRIEF DESCRIPTION OF THE DRAWINGS

To describe technical solutions of embodiments of this application more clearly, the following briefly introduces accompanying drawings required for describing embodiments. Apparently, the accompanying drawings in the following description show only some embodiments of this application, and a person of ordinary skill in the art may still derive other drawings from these accompanying drawings without creative efforts.

DESCRIPTION OF EMBODIMENTS

To make the objectives, technical solutions, and advantages of this application clearer, this application is further described below in detail with reference to the accompanying drawings and embodiments. The specific embodiments described herein are only used for explaining this application, and are not used for limiting this application.

Figure 1:
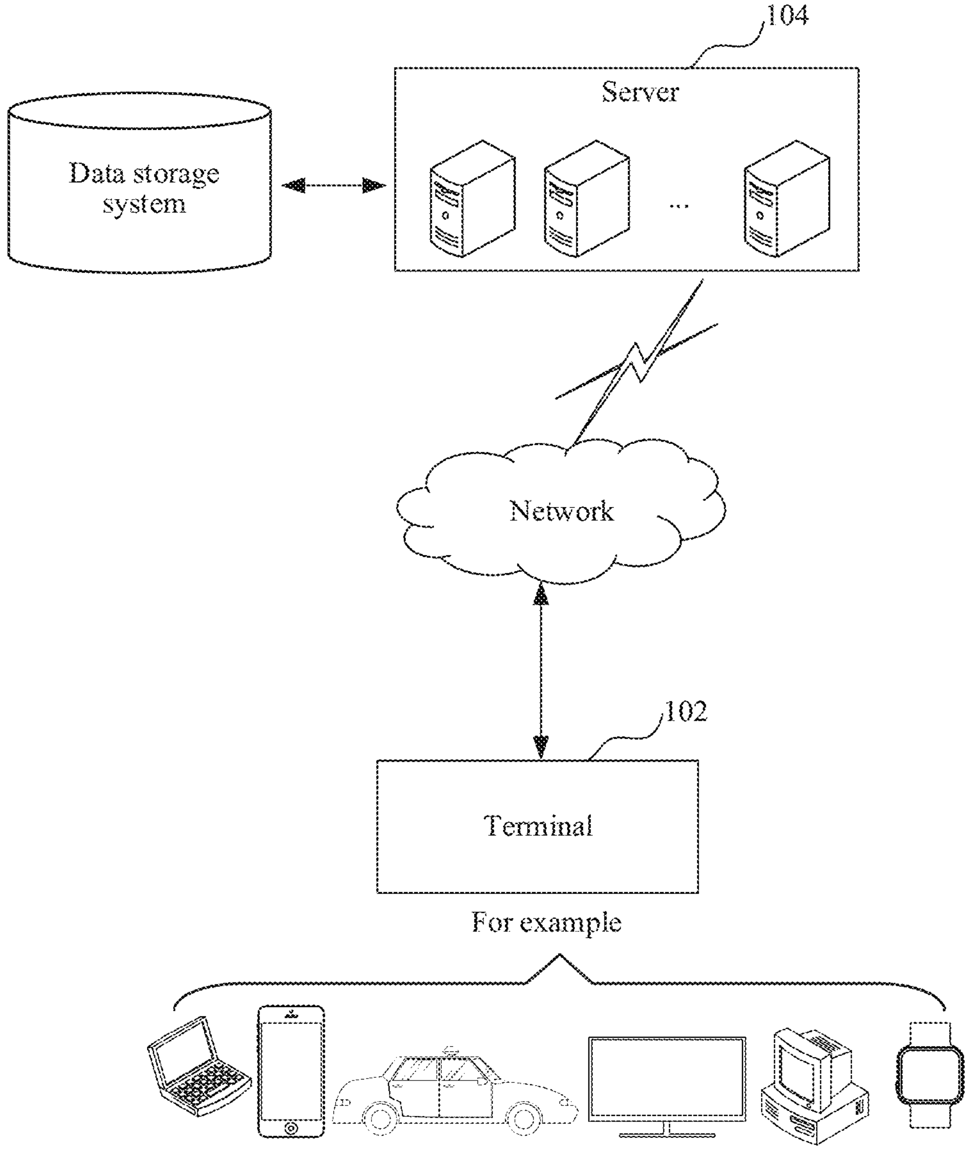
FIG. 1 is a schematic diagram of an application environment of an illumination information loading method according to some embodiments.

An illumination information loading method provided in an embodiment of this application may be applied to an application environment shown in FIG. 1. A terminal 102 communicates with a server 104 via a network. A data storage system may store data that needs to be processed by the server 104. The data storage system may be integrated on the server 104, or provided on a cloud or another server.

Specifically, when the terminal 102 determines a target image, the target image may be an image configured for presenting a picture in a virtual scene, for example, may be an image presenting a picture in a game. The terminal 102 may determine at least one candidate illumination information storage block, where the candidate illumination information storage block is an illumination information storage block associated with a target image, determine a storage block weight corresponding to the at least one candidate illumination information storage block, and determine a target illumination information storage block from the at least one candidate illumination information storage block based on the storage block weight, and load the target illumination information storage block. The terminal 102 may perform illumination calculation by using a loaded illumination information storage block to perform rendering, so as to obtain a target image. The terminal 102 may transmit a rendered target image to the server 104. The server 104 may store the target image or transmit the target image to another device. The terminal 102 may alternatively display the target image after the target image is rendered.

The terminal 102 may be, but is not limited to, a desktop computer, a laptop computer, a smart phone, a tablets computer, an Internet of Things device, or a portable wearable device. The Internet of Things device may be a smart speaker, a smart television, a smart air conditioner, a smart on-board device, or the like. The portable wearable device may be a smartwatch, a smart band, a head-mounted device, or the like. The server 104 may be implemented by using an independent server or a server cluster that includes a plurality of servers.

Figure 2:
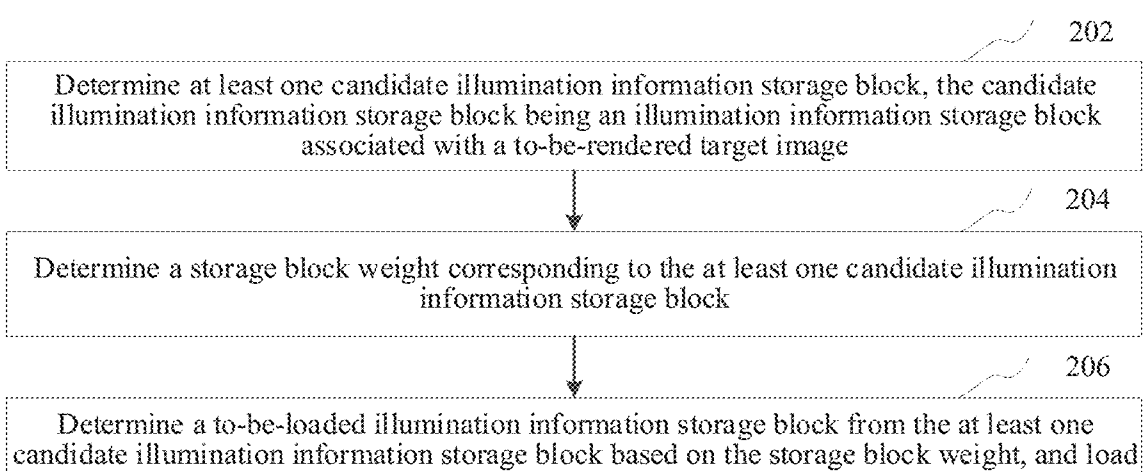
FIG. 2 is a schematic flowchart of an illumination information loading method according to some embodiments.

In some embodiments, as shown in FIG. 2, an illumination information loading method is provided. The method may be performed by a terminal or a server, or may be performed jointly by a terminal and a server. An example in which the method is applied to the terminal 102 in FIG. 1 is used for description. The method includes the following operations:

Operation 202: Determine at least one candidate illumination information storage block, the candidate illumination information storage block being an illumination information storage block associated with a target image.

The target image is a to-be rendered image. A picture in a virtual scene is presented in the target image. The virtual scene is a fictional scene, including but not limited to a virtual animation scene or a virtual game scene. The target image includes but is not limited to a video frame in a to-be-rendered game or a video frame in an animation. The virtual scene is located in three-dimensional world space. In other words, objects in the virtual scene are distributed in the three-dimensional world space. The three-dimensional world space in which the virtual scene is located may also be referred to as scene space.

The illumination information storage block is configured for storing illumination information. The illumination information storage block includes a plurality of illumination information storage units. A plurality of illumination information storage units mean at least two illumination information storage units, for example, 64 illumination information storage units. The illumination information storage block is a set of the plurality of illumination information storage units, and the illumination information storage unit is configured to store the illumination information. The illumination information storage block is located in the three-dimensional world space, and the illumination information storage units in the illumination information storage block are located in the three-dimensional world space. The illumination information storage units in the illumination information storage block may be evenly distributed in the three-dimensional world space, or may be unevenly distributed. For example, the three-dimensional world space is represented by a three-dimensional coordinate system (an XYZ coordinate system). The illumination information storage units in the illumination information storage block are arranged in a block structure in an X-axis direction, a Y-axis direction, and a Z-axis direction at fixed intervals. The fixed interval may be set as needed, for example, the fixed interval is 16 m.

The illumination information may include one or more sphere harmonic (SH) coefficients. A plurality of sphere harmonic coefficients mean at least two sphere harmonic coefficients. Each illumination information storage block may be understood as a light source. The illumination information stored in the illumination information storage block is configured for representing information of the light source. Any light source may be represented by a sphere harmonic function. The sphere harmonic function is a linear combination of one or more basis functions, namely, a weighted form. Each basis function in the sphere harmonic function has a corresponding weight. The sphere harmonic coefficient is a weight of the basis function in the sphere harmonic function. For example, if the light source is represented by a third-order sphere harmonic function, because the third-order sphere harmonic function has $((1+3+5)\times 3=27)$ 27 sphere harmonic coefficients, the illumination information may include 27 sphere harmonic coefficients. The illumination information may also be referred to as illumination data.

A plurality of illumination information storage blocks may be pre-generated in the three-dimensional world space. Each illumination information storage block has block precision. The block precision represents density of the illumination information storage units in the illumination information storage block. Higher block precision indicates denser illumination information storage units in the illumination information storage block. Lower block precision indicates sparser illumination information storage units in the illumination information storage block. A quantity of illumination information storage units included in each illumination information storage block may be the same or different. For example, each illumination information storage block includes 64 illumination information storage units. Block precision of different illumination information storage blocks may be the same or different. There are overlapping areas or non-overlapping areas between space areas occupied by the illumination information storage blocks in the three-dimensional world space. For example, there is no overlapping area between space areas occupied by illumination information storage blocks with the same block precision in the three-dimensional world space. Space areas occupied by illumination information storage blocks having low block precision in the three-dimensional world space may include illumination information storage blocks having high block precision. The block precision may be represented by a distance between adjacent illumination information storage units.

The block precision includes but is not limited to at least one of a highest precision level, a medium precision level, or a lowest precision level. An illumination information storage block having the highest precision level is an illumination information storage block for which sampling points are arranged at minimum intervals around an object.

An illumination information storage block having the lowest precision level is an illumination information storage block for which sampling points are arranged at maximum intervals away from an object in scene space (that is, the three-dimensional world space in which the virtual scene is located). An illumination information storage block having the medium precision level is an illumination information storage block for which sampling points are arranged at middle intervals. The middle interval is greater than the minimum interval, and the middle interval is smaller than the maximum interval.

Among the illumination information storage blocks pre-generated in the three-dimensional world space, there may be one or more illumination information storage blocks associated with the target image. A plurality of illumination information storage blocks mean at least two illumination information storage blocks. The illumination information storage block associated with the target image includes but is not limited to at least one of an illumination information storage block adjacent to a location of a pixel point in the target image in the three-dimensional world space or an illumination information storage block adjacent to a location of a key object in the target image in the three-dimensional world space. The key object in the target image may be an animate object or an inanimate object. The key object includes but is not limited to at least one of a main virtual character or a main virtual object in the target image, that is, a main translucent object. The candidate illumination information storage block is an illumination information storage block associated with the target image.

Specifically, the plurality of illumination information storage blocks are pre-generated in the three-dimensional world space. The pre-generated illumination information storage blocks may be referred to as preset illumination information storage block. To perform rendering to obtain the target image, the terminal may determine, from the preset illumination information storage blocks in the world space, illumination information storage blocks associated with the target image. For example, the illumination information storage blocks associated with the target image may be determined based on the pixel point or the key object of the target image. The terminal may determine, from the illumination information storage blocks associated with the target image, one or more candidate illumination information storage blocks. A plurality of candidate illumination information storage blocks mean at least two candidate illumination information storage blocks. Illumination information storage blocks having different block precision may be generated based on locations of objects in the virtual scene. For example, when a space area occupied by the illumination information storage block is determined. If there are many objects inside or around the space area, an illumination information storage block having high block precision is generated in the space area. If there are fewer objects inside and around the space area, an illumination information storage block having low block precision is generated in the space area.

In some embodiments, the illumination information storage block associated with the target image is referred to as an associated illumination information storage block. There is at least one associated illumination information storage block. The terminal may determine all associated illumination information storage blocks as the candidate illumination information storage blocks or select the candidate illumination information storage block from the associated illumination information storage block. For example, the terminal may select each candidate illumination information storage block from the associated illumination information storage blocks based on the block precision. Generally, because a data volume of the illumination information storage block having the lowest precision level is very small, all illumination information storage blocks having the lowest precision level can be loaded permanently, so that there is no need to load the illumination information storage block having the lowest precision level repeatedly during dynamically loading of the illumination information storage block. In this case, the terminal may select, from the associated illumination information storage blocks, an associated illumination information storage block of which block precision is higher than the lowest precision level, to obtain each candidate illumination information storage block. In other words, the associated illumination information storage block having the lowest precision level is filtered out from the associated illumination information storage blocks, and remaining associated illumination information storage blocks may be determined as the candidate illumination information storage blocks.

In some embodiments, the illumination information storage block is a volumetric lightmap block (Brick). The volumetric lightmap block includes a plurality of light probes, and an illumination information storage unit in the illumination information storage block is a light probe. The light probe is configured to store light baking information in the virtual scene. The light probe is pre-placed in the virtual scene. A shape of the light probe may be at least one of a sphere or a polygon, for example, a sphere. Because illumination information stored in the light probe is obtained through collecting illumination information in the three-dimensional world space, the light probe may also be referred to as a sampling point. The volumetric lightmap block may be understood as a set of adjacent sampling points at equal intervals in the three-dimensional world space, that is, a set including a plurality of sampling points. For example, the volumetric lightmap block is a 4×4×4 sampling point set at an interval of 16 m. The 4×4×4 sampling point set is a set of 64 sampling points having four sampling points respectively arranged in the X-axis direction, Y-axis direction, and Z-axis direction at an interval of 16 m. The interval is a distance between adjacent sampling points, and may also be referred to as an interval between adjacent sampling points.

Figure 3:
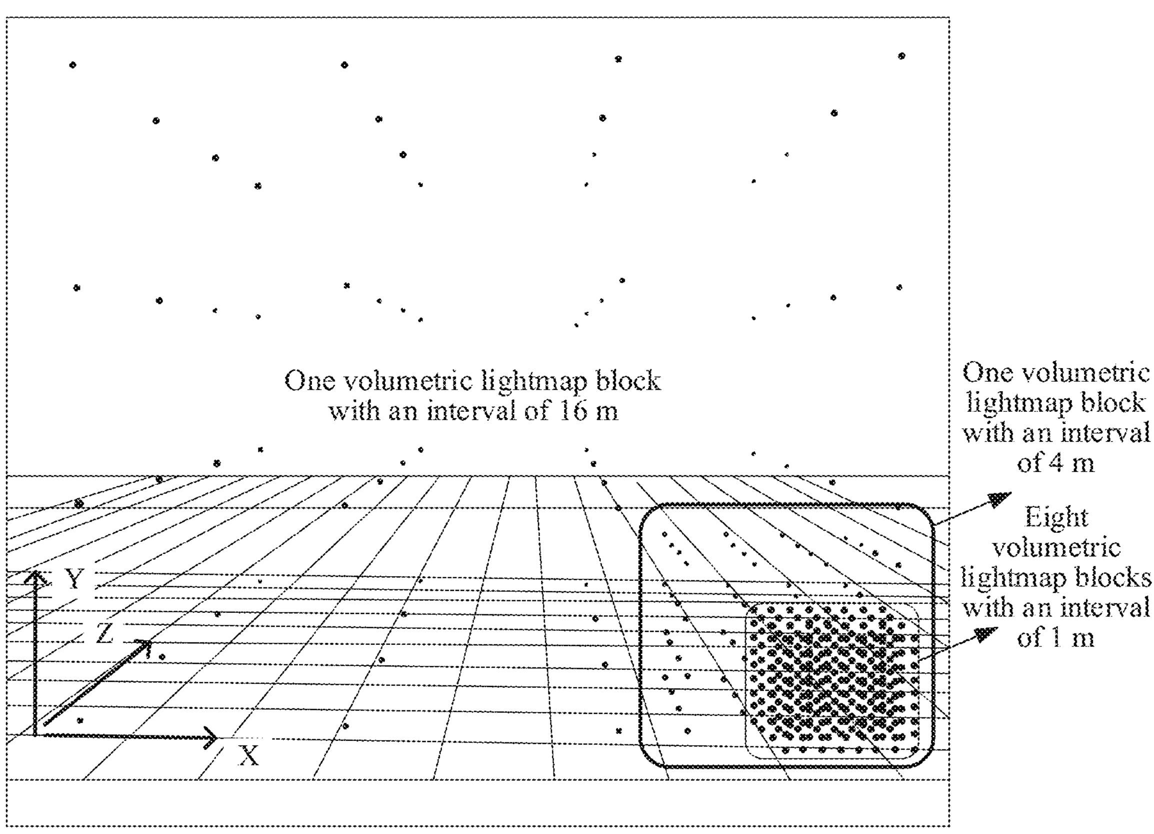
FIG. 3 is a schematic diagram of volumetric lightmap blocks according to some embodiments.

As shown in FIG. 3, one volumetric lightmap block with an interval of 16 m, one volumetric lightmap block with an interval of 4 m, and eight volumetric lightmap blocks with an interval of 1 m are shown. A space area occupied by the volumetric lightmap block with an interval of 16 m includes the volumetric lightmap block with an interval of 4 m. A space area occupied by the volumetric lightmap block with an interval of 4 m includes the eight volumetric lightmap blocks with an interval of 1 m. Block precision of the volumetric lightmap block with an interval of 16 m is in the lowest precision level, block precision of the volumetric lightmap block with an interval of 4 m is in the medium precision level, and block precision of the volumetric lightmap block with an interval of 1 m is in the highest precision level.

In some embodiments, the volumetric lightmap block is stored in a virtual volumetric lightmap. The virtual volumetric lightmap is pre-generated, may be baked data obtained through baking, and stores a plurality of volumetric lightmap blocks. The virtual volumetric lightmap is a three-dimensional (3D) map. The virtual volumetric lightmap may be stored in a hard disk. Volumetric lightmap blocks in the virtual scene are stored in the virtual volumetric lightmap by volumetric lightmap blocks. The candidate illumination information storage block may be a volumetric lightmap block selected from the virtual volumetric lightmap. A size of the virtual volumetric lightmap is determined based on the included volumetric lightmap blocks. For example, the virtual volumetric lightmap that stores the 10 volumetric lightmap blocks in FIG. 3 is a 3D map with a size of 40×4×4. The 3D map may be understood as a three-dimensional array. 40×4×4 includes 10 blocks of 4×4×4. The 10 blocks of 4×4×4 are arranged along the X axis to obtain a three-dimensional array with a size of 40×4×4. Each 4×4×4 in 40×4×4 is a volumetric lightmap block.

In some embodiments, each illumination information storage block may be understood as a light source. The illumination information stored in the illumination information storage block is configured for representing information of the light source. Any light source may be represented by a sphere harmonic function. The sphere harmonic function is a linear combination of one or more basis functions, namely, a weighted form. Each basis function in the sphere harmonic function has a corresponding weight. The sphere harmonic coefficient is a weight of the basis function in the sphere harmonic function. Therefore, when the light source is represented by the sphere harmonic function, the illumination information may include a sphere harmonic coefficient. For example, the illumination information may include all sphere harmonic coefficients of a third-order sphere harmonic function, and because the third-order sphere harmonic function has 27 sphere harmonic coefficients, the illumination information may include 27 sphere harmonic coefficients. The illumination information may also be referred to as illumination data. The light probe of the volumetric lightmap block stores the sphere harmonic coefficient. Because only four sphere harmonic coefficients can be stored in one volumetric lightmap, for example, four channels of RGBA are each used to store one sphere harmonic coefficient, when the illumination information includes four or more sphere harmonic coefficients, two or more volumetric lightmaps may be used to store the illumination information. An example in which the illumination information includes 27 sphere harmonic coefficients is used. Seven 3D volumetric lightmaps may be used to store the sphere harmonic coefficients. Each channel of RGBA in the map stores one sphere harmonic coefficient.

Operation 204: Determine a storage block weight corresponding to the at least one candidate illumination information storage block.

Each candidate illumination information storage block corresponds to a storage block weight. The storage block weight is configured for representing an impact of the candidate illumination information storage block on an illumination effect of the target image. A higher storage block weight indicates greater impact of the candidate illumination information storage block on the illumination effect of the target image. Performing light rendering by using a candidate illumination information storage block having a great storage block weight can improve the illumination effect in a rendered target image, so that the illumination effect in the target image is more real.

Specifically, for each candidate illumination information storage block, the terminal may determine the storage block weight corresponding to the candidate illumination information storage block based on at least one of a depth value of a pixel point adjacent to the candidate illumination information storage block or a depth value of the candidate illumination information storage block. For example, the storage block weight is in negative correlation with the depth value of the adjacent pixel point, and the storage block weight is in negative correlation with the depth value of the candidate illumination information storage block. The depth value is a distance of a pixel point from a camera in three-dimensional world space. A greater depth value indicates a longer distance of the pixel point from the camera. The negative correlation means that when other conditions remain unchanged, two variables change in an opposite direction, and when one variable changes from large to small, the other variable changes from small to large.

In some embodiments, a pixel point adjacent to the candidate illumination information storage block may be referred to as an adjacent pixel point of the candidate illumination information storage block. The candidate illumination information storage block may have at least one adjacent pixel point. When the pixel point is adjacent to the candidate illumination information storage block, it may be referred to as that the candidate illumination information storage block is adjacent to the pixel point. In this case, the adjacent pixel point of the candidate illumination information storage block may be determined based on the candidate illumination information storage block adjacent to the pixel point. For example, if a pixel point A and a pixel point B are adjacent to a candidate illumination information storage block 1, all adjacent pixel points of the candidate illumination information storage block 1 include the pixel point A and the pixel point B.

Operation 206: Determine a target illumination information storage block from the at least one candidate illumination information storage block based on the storage block weight, and load the target illumination information storage block, a loaded illumination information storage block being configured for performing illumination calculation to perform rendering, so as to obtain a target image.

The target illumination information storage block is from the at least one candidate illumination information storage block. As the illumination information storage block is loaded, the target illumination information storage block constantly changes, and the target illumination information storage block may not be loaded successfully. The loaded illumination information storage block is an illumination information storage block successfully loaded in the at least one candidate illumination information storage block.

Specifically, the terminal may determine the target illumination information storage block from the at least one candidate illumination information storage block in descending order of the storage block weights, and load the target illumination information storage block, in other words, first load an illumination information storage block having a great storage block weight. For example, an identifier of the candidate illumination information storage block may be arranged based on the storage block weight to obtain an identifier sequence. A candidate illumination information storage block represented by the first identifier of the identifier sequence is determined as the target illumination information storage block. After the target illumination information storage block is loaded, a candidate illumination information storage block represented by a next identifier in the identifier sequence is determined as the target illumination information storage block. A cycle is repeated a plurality of times until the candidate illumination information storage blocks are loaded. When the candidate illumination information storage block is a volumetric lightmap block from a virtual volumetric lightmap, the identifier of the candidate illumination information storage block is a block index. The block index is a location of the volumetric lightmap block in the virtual volumetric lightmap.

In some embodiments, the terminal may determine the target illumination information storage block from the at least one candidate illumination information storage block in descending order of the storage block weights. When there is free block storage space, the target illumination information storage block is loaded, and the loading stops until there is no free block storage space. A total capacity of the storage space configured for storing the illumination information storage block in an internal memory of a graphics processing unit (GPU) may be fixed, and a capacity of the free block storage space is the capacity of the fixed storage resource minus a capacity of occupied block storage space. In some embodiments, a preset illumination information storage block having the lowest precision level is permanently loaded into the memory of the GPU in the terminal, and the at least one candidate illumination information storage block does not include the preset illumination information storage block having the lowest precision level. The terminal may perform illumination calculation by using the at least one illumination information storage block among the loaded illumination information storage blocks to perform rendering, so as to obtain the target image. There may be a plurality of loaded illumination information storage blocks, including the preset illumination information storage block having the lowest precision level and the illumination information storage block after the loading.

In some embodiments, for each pixel point in screen space, the screen space is two-dimensional (2D) space of a screen, and a size of the screen space is a size of the screen. Using a pixel as a unit, the size of the screen may be set, for example, 1280×720. A size of the target image is the same as the size of the screen space, and in this case, a pixel point in the target image may also be referred to as the pixel point in the screen space. The terminal may determine a three-dimensional world space location of the pixel point. The three-dimensional world space location of the pixel point is a location of the pixel point in the three-dimensional world space. The location of the pixel point in the three-dimensional world space is uniquely determined by coordinates of the pixel point in the three-dimensional world space. The coordinates in the three-dimensional world space may be referred to as world coordinates. The terminal may determine the illumination information storage block adjacent to the pixel point from the loaded illumination information storage block based on the three-dimensional world space location of the pixel point. For example, for each loaded illumination information storage block, when a space area occupied by the loaded illumination information storage block in the three-dimensional world space includes the three-dimensional world space location of the pixel point, the loaded illumination information storage block is determined as the illumination information storage block adjacent to the pixel point. When the occupied space area includes a plurality of illumination information storage blocks of the three-dimensional world space location of the pixel point, the terminal may determine an illumination information storage block having the highest block precision among the plurality of illumination information storage blocks as the illumination information storage block adjacent to the pixel point, and determine illumination information corresponding to the pixel point based on the illumination information storage block adjacent to the pixel point. When the illumination information corresponding to the pixel points in the screen space is obtained, the illumination information corresponding to each pixel point may be used to perform illumination calculation to perform rendering, so as to obtain the target image.

In some embodiments, the illumination information storage block includes a plurality of illumination information storage units. The illumination information storage units correspond to three-dimensional world space locations, and the illumination information storage units store illumination information corresponding to the illumination information storage units at the three-dimensional world space locations. When determining the illumination information storage block adjacent to the pixel point, the terminal may determine an illumination information storage unit adjacent to the pixel point from the illumination information storage units included in the illumination information storage block adjacent to the pixel point, and perform calculation based on the illumination information stored in the illumination information storage unit adjacent to the pixel point to obtain the illumination information corresponding to the pixel point. Specifically, for the illumination information storage unit adjacent to the pixel point in the illumination information storage block, the terminal may calculate a distance between the three-dimensional world space location of the pixel point and the three-dimensional world space location of the illumination information storage unit, and determine an illumination information storage unit of which the distance is less than a first distance threshold as the illumination information storage unit adjacent to the pixel point. The first distance threshold may be preset or set based on needs. Alternatively, the terminal may arrange the illumination information storage units in descending order of distances to obtain a storage unit sequence, and determine illumination information storage units arranged before a preset order in the storage unit sequence as the illumination information storage units adjacent to the pixel point. The preset order may be set based on needs. For example, if the illumination information storage unit is the fifth in the preset order, the first illumination information storage unit to the fourth illumination information storage unit are determined as the illumination information storage units adjacent to the pixel point.

In some embodiments, the illumination information storage block is a volumetric lightmap block. A physical volumetric lightmap is used to store the loaded volumetric lightmap blocks in the memory of the GPU. In the virtual volumetric lightmap, only volumetric lightmap blocks that need to be used in a current picture are loaded into the physical volumetric lightmap. Therefore, a size of the physical volumetric lightmap is smaller than a size of the virtual volumetric lightmap. The total capacity of the storage space configured to store the volumetric lightmap block in the memory of the GPU may be referred to as a total capacity of the physical volumetric lightmap block. A capacity of the free block storage space may be referred to as an available physical volumetric lightmap block capacity. A capacity of the storage space for storing the volumetric lightmap block having the lowest precision level is a total capacity of the volumetric lightmap block having the lowest precision level. When the volumetric lightmap block having the lowest precision level is permanently loaded in the memory of the GPU of the terminal, the available physical volumetric lightmap block capacity=the total capacity of the physical volumetric lightmap block−the total capacity of the volumetric lightmap block having the lowest precision level.

In some embodiments, to ensure accuracy of map linear interpolation sampling, each volumetric lightmap block needs to be expanded by a texel, and the expanded texel stores illumination data of adjacent sampling points, such as a 4×4×4 volumetric lightmap block. In an actual physical volumetric lightmap, a size of a volumetric lightmap block is 5×5×5.

In the foregoing illumination information loading method, at least one candidate illumination information storage block is determined. The candidate illumination information storage block is an illumination information storage block associated with a target image. A storage block weight corresponding to the at least one candidate illumination information storage block is determined. A target illumination information storage block is determined from the at least one candidate illumination information storage block based on the storage block weight, and the target illumination information storage block is loaded. A loaded illumination information storage block is configured for performing illumination calculation to perform rendering, so as to obtain a target image. Because the target illumination information storage block is selected based on the storage block weight, the illumination information storage block that has a great impact on the illumination calculation may be loaded. When a rendering effect is ensured, a quantity of loaded illumination information storage blocks is reduced as much as possible, to save storage resources.

In some embodiments, the determining at least one candidate illumination information storage block includes: determining an associated illumination information storage block of the target image from a plurality of preset illumination information storage blocks; and determining the candidate illumination information storage block based on the associated illumination information storage block.

There are a plurality of preset illumination information storage blocks. The plurality of preset illumination information storage blocks mean at least two preset illumination information storage blocks. The associated illumination information storage block is a preset illumination information storage block that has an impact on the illumination effect of the target image. There are at least one associated illumination information storage block and at least one candidate illumination information storage block.

Specifically, the terminal may determine the associated illumination information storage block of the target image based on the three-dimensional world space location of the pixel point in the screen space. For example, the terminal may obtain a block area of the preset illumination information storage block. The block area of the preset illumination information storage block is a space area occupied by the preset illumination information storage block in the three-dimensional world space. For pixel points in the screen space, the terminal may determine, from the plurality of preset illumination information storage blocks, first illumination information storage blocks respectively adjacent to the plurality of pixel points in the target image. Each pixel point corresponds to one first illumination information storage block, and a block area of the first illumination information storage block adjacent to the pixel point includes a three-dimensional world space location of the pixel point. When one or more block areas of the preset illumination information storage block include the three-dimensional world space location of the pixel point, a preset illumination information storage block having high block precision is determined as the first illumination information storage block of the pixel point. For example, S1 and S2 are two preset illumination information storage blocks, block areas of S1 and S2 both include a three-dimensional world space location of a pixel point A, and block precision of S1 is higher than block precision of S2, and in this case, S1 is determined as a first illumination information storage block of the pixel point. The terminal may determine the associated illumination information storage block based on the first illumination information storage blocks respectively adjacent to the plurality of pixel points. For example, the terminal may perform deduplication processing on the first illumination information storage blocks to obtain associated illumination information storage blocks. In other words, different first illumination information storage blocks in the first illumination information storage blocks are determined as the associated illumination information storage blocks. For example, an example in which the plurality of pixel points are a pixel point 1 to a pixel point 5 is used. A first illumination information storage block adjacent to the pixel point 1 is S1, a first illumination information storage block adjacent to the pixel point 2 is S1, a first illumination information storage block adjacent to the pixel point 3 is S2, a first illumination information storage block adjacent to the pixel point 4 is S1, and the first illumination information storage block adjacent to the pixel point 5 is S2, and in this case, the first illumination information storage blocks that are different from each other are S1 and S2, so that S1 and S2 can be determined as two associated illumination information storage blocks.

In some embodiments, the terminal may determine the associated illumination information storage block based on a three-dimensional world space location of a key object in the target image. Specifically, the terminal may determine a bounding box of the key object. The bounding box of the key object is a geometry that can wrap the key object in the three-dimensional world space. The bounding box may be any geometry, including but not limited to any one of a sphere, a cone, or a cube. For example, the bounding box of the key object in the three-dimensional world space is the smallest cube that can wrap the key object. The terminal may determine the associated illumination information storage block based on the bounding box of the key object. For example, the terminal may determine a preset illumination information storage block in which the block area intersects the bounding box as a second illumination information storage block adjacent to the key object, or determine a preset illumination information storage block in which a distance between the block area and the bounding box is less than a second distance threshold as a second illumination information storage block adjacent to the key object. Because there may be a plurality of key objects, and second illumination information storage blocks adjacent to different key objects may be the same, the terminal may determine different illumination information storage blocks in the second illumination information storage blocks as the associated illumination information storage blocks.

In some embodiments, the terminal may determine the associated illumination information storage block based on the three-dimensional world space location of the pixel point in the screen space and the location of the key object in the three-dimensional world space. Specifically, the terminal may determine different illumination information storage blocks from the first illumination information storage blocks and the second illumination information storage blocks to obtain the associated illumination information storage blocks. In other words, the terminal performs deduplication on the first illumination information storage blocks and the second illumination information storage blocks to obtain the associated illumination information storage blocks.

In some embodiments, the illumination information storage block is a volumetric lightmap block, and the preset illumination information storage block is a volumetric lightmap block stored in a virtual volumetric lightmap. The terminal may determine an associated volumetric lightmap block of the target image from the virtual volumetric lightmap, determine a candidate volumetric lightmap block based on the associated volumetric lightmap block, determine a storage block weight corresponding to at least one candidate volumetric lightmap block, determine a to-be-loaded volumetric lightmap block from the at least one candidate volumetric lightmap block based on the storage block weight, and load the to-be-loaded volumetric lightmap block. A loaded volumetric lightmap block is configured for performing illumination calculation to perform rendering, so as to obtain a target image.

In this embodiment, because the illumination information storage block associated with the target image has an impact on an illumination effect of a rendered target image, the candidate illumination information storage block is determined based on the associated illumination information storage block, so that the selected candidate illumination information storage block is an illumination information storage block that has an impact on the illumination effect of the target image, thereby improving accuracy of selecting the candidate illumination information storage block.

In some embodiments, the determining an associated illumination information storage block of the target image from a plurality of preset illumination information storage blocks includes: determining, from the plurality of preset illumination information storage blocks, first illumination information storage blocks respectively adjacent to a plurality of pixel points in the target image; and performing deduplication processing based on the first illumination information storage blocks to obtain the associated illumination information storage block of the target image.

The plurality of pixel points in the target image are a plurality of pixel points in screen space. Each pixel point corresponds to one first illumination information storage block, and a block area of the first illumination information storage block adjacent to the pixel point includes a three-dimensional world space location of the pixel point. The deduplication processing is to remove identical illumination information storage blocks and retain different illumination information storage blocks.

Specifically, the terminal may obtain a block area of the preset illumination information storage block. The block area of the preset illumination information storage block is a space area occupied by the preset illumination information storage block in the three-dimensional world space. For pixel points in the screen space, the terminal may determine, from the plurality of preset illumination information storage blocks, first illumination information storage blocks respectively adjacent to the plurality of pixel points in the target image. For example, the terminal determines the preset illumination information storage block of the block area including the three-dimensional world space location of the pixel point as the first illumination information storage block of the pixel point. When one or more block areas of the preset illumination information storage block include the three-dimensional world space location of the pixel point, the terminal may determine a preset illumination information storage block having high block precision as the first illumination information storage block of the pixel point.

In some embodiments, the terminal may obtain block indexes respectively corresponding to a plurality of index data points. The block indexes are in one-to-one correspondence to the preset illumination information storage blocks. The block indexes are configured for uniquely identifying the preset illumination information storage blocks. When the plurality of preset illumination information storage blocks are the volumetric lightmap blocks in the virtual volumetric lightmap, the illumination information storage block is the volumetric lightmap block, and the block indexes are locations of the volumetric lightmap blocks in the virtual volumetric lightmap. The locations of the volumetric lightmap blocks in the virtual volumetric lightmap may be uniquely identified by volumetric lightmap block coordinates (BrickUVIndex). In other words, the block indexes may be the volumetric lightmap block coordinates, and the volumetric lightmap block coordinates are 3D coordinates. For example, volumetric lightmap block coordinates are (xi, yi, zi), and (xi, yi, zi) represents a volumetric lightmap block located at an $xi^{th}$ position in an X direction, a $yi^{th}$ position in a Y direction, and a $zi^{th}$ position in a Z direction in the virtual volumetric lightmap. The terminal may select, for a pixel point among the plurality of pixel points, a block index corresponding to an index data point adjacent to the pixel point from the block indexes respectively corresponding to the plurality of index data points to obtain a target block index corresponding to the pixel point. A preset illumination information storage block pointed by the target block index corresponding to the pixel point is the first illumination information storage block adjacent to the pixel point. The terminal may perform deduplication processing on the target block index corresponding to each pixel point to obtain remaining target block indexes after the deduplication processing, and obtain the associated illumination information storage blocks of the target image based on the preset illumination information storage blocks respectively pointed by the remaining target block indexes after the deduplication processing. For example, the preset illumination information storage blocks respectively pointed by the remaining target block indexes after the deduplication processing may be determined as the associated illumination information storage blocks of the target image.

In some embodiments, the terminal may determine the associated illumination information storage block based on the first illumination information storage blocks respectively adjacent to the plurality of pixel points. For example, the terminal may perform deduplication processing on the first illumination information storage blocks to obtain associated illumination information storage blocks. In other words, different first illumination information storage blocks in the first illumination information storage blocks are determined as the associated illumination information storage blocks.

In some embodiments, the terminal may perform deduplication processing based on the first illumination information storage blocks to obtain associated illumination information storage blocks of the target image. For example, the terminal may select different first illumination information storage blocks from the first illumination information storage blocks to obtain the associated illumination information storage blocks of the target image.

In this embodiment, because the first illumination information storage block is adjacent to the pixel point in the target image, the first illumination information storage block has a great impact on the illumination effect at the pixel point, so that the associated illumination information storage block of the target image is obtained based on the first illumination information storage block, thereby improving accuracy of the associated illumination information storage block. In addition, a pixel point is used to search for the associated illumination information storage block. For an opaque object in the target image, light rendering may be performed based on the associated illumination information storage block, so that properness of the associated illumination information storage block can be improved.

In some embodiments, the determining, from the plurality of preset illumination information storage blocks, first illumination information storage blocks respectively adjacent to the plurality of pixel points in the target image includes: obtaining block indexes respectively corresponding to a plurality of index data points, the block indexes being in one-to-one correspondence to the preset illumination information storage blocks; selecting, for a pixel point among the plurality of pixel points of the target image, a block index corresponding to an index data point adjacent to the pixel point from the block indexes respectively corresponding to the plurality of index data points to obtain a target block index corresponding to the pixel point; and determining a preset illumination information storage block corresponding to the target block index as a first illumination information storage block adjacent to the pixel point.

The block indexes are in one-to-one correspondence to the preset illumination information storage blocks. The block indexes are configured for uniquely identifying the preset illumination information storage blocks. When the plurality of preset illumination information storage blocks are the volumetric lightmap blocks in the virtual volumetric lightmap, the illumination information storage block is the volumetric lightmap block, and the block indexes are locations of the volumetric lightmap blocks in the virtual volumetric lightmap. The locations of the volumetric lightmap blocks in the virtual volumetric lightmap may be uniquely identified by volumetric lightmap block coordinates. In other words, the block indexes may be the volumetric lightmap block coordinates, and the volumetric lightmap block coordinates are 3D coordinates. For example, volumetric lightmap block coordinates are (xi, yi, zi), and (xi, yi, zi) represents a volumetric lightmap block located at an $xi^{th}$ position in an X direction, a $yi^{th}$ position in a Y direction, and a $zi^{th}$ position in a Z direction in the virtual volumetric lightmap. For example, the virtual volumetric lightmap includes 10 volumetric lightmap blocks that are arranged sequentially along the X-axis direction. Volumetric lightmap block coordinates of the first volumetric lightmap block are (1, 1, 1), and volumetric lightmap block coordinates of the second volumetric lightmap block are (2, 1, 1). The plurality of index data points are a plurality of points distributed in the three-dimensional world space. The space area in which the plurality of index data points are distributed may cover space areas covered by the plurality of preset illumination information storage blocks. A distance between adjacent index data points is the same, and an interval between adjacent index data points may be set based on needs. For example, for the 10 volumetric lightmap blocks distributed in FIG. 3, the volumetric lightmap blocks with an interval of 16 m occupy largest space. The space area occupied by the volumetric lightmap blocks with an interval of 16 m is a space area of 16 (m)×16 (m)×16 (m). To enable the space area in which the plurality of index data points are distributed to cover the space area occupied by the volumetric lightmap blocks with an interval of 16 m, the plurality of index data points may be evenly distributed within the space area occupied by the volumetric lightmap blocks with an interval of 16 m. For example, the interval between adjacent index data points is 4 m, and a plurality of index data points of 16×16×16 are generated. The target block index corresponding to the pixel point is a block index corresponding to the index data point adjacent to the pixel point.

Specifically, the terminal may obtain the three-dimensional world space location of the pixel point and a three-dimensional world space location of the index data point, calculate a distance between the three-dimensional world space location of the pixel point and the three-dimensional world space location of the index data point, and determine a closest index data point as the index data point adjacent to the pixel point. In some embodiments, the plurality of index data points respectively correspond to block information, and the block information includes block indexes and block precision. The block precision in the block information is block precision of an illumination information storage block represented by the block index in the block information. For example, the block precision may be represented by a distance between adjacent sampling points. The block precision is in negative correlation with the distance between adjacent sampling points. A higher block precision indicates a shorter distance between adjacent sampling points.

In some embodiments, the plurality of preset illumination information storage blocks are the volumetric lightmap blocks in the virtual volumetric lightmap. The illumination information storage block is the volumetric lightmap block. The block index is the volumetric lightmap block coordinates of the volumetric lightmap block in the virtual volumetric lightmap. The plurality of index data points respectively correspond to block indexes stored in a virtual indirect index map. The virtual indirect index map stores the block indexes respectively corresponding to the plurality of index data points. The virtual indirect index map may further store block precision of volumetric lightmap blocks represented by the block indexes. The virtual indirect index map stores the block indexes corresponding to the plurality of index data points. The block indexes may be pre-generated. When the corresponding block index for each index data point is generated, the block index of the index data point may be determined based on a volumetric lightmap block adjacent to the index data point. For example, when the space area occupied by the volumetric lightmap blocks includes the index data points, indexes of the volumetric lightmap blocks are determined as the block indexes corresponding to the index data points. When the space area occupied by the plurality of volumetric lightmap blocks includes the index data points, the block indexes corresponding to the index data points may be determined based on the block precision. For example, block indexes of volumetric lightmap blocks having high block precision may be determined as the block indexes corresponding to the index data points. For example, for a plurality of index data points with an interval of 4 m between adjacent index data points and a size of 16×16×16, when block indexes and block precision corresponding to the index data points are generated, volumetric lightmap blocks within 4 m around the index data points may be obtained. The block indexes and the block precision corresponding to the index data points are generated by using block indexes and block precision of the volumetric lightmap blocks within 4 m and stored in the virtual indirect index map. Block information of the index data points stored in the virtual indirect index map is texel. The block information includes indexes and the block precision. In this case, each texel in the virtual indirect index map stores volumetric lightmap block coordinates and the block precision of the volumetric lightmap blocks within 4 m in the virtual volumetric lightmap.

In some embodiments, the illumination information storage block is a volumetric lightmap block. A physical indirect index map is used to store block indexes of the loaded volumetric lightmap blocks in the memory of the GPU. The physical indirect index map is similar to the virtual indirect index map, and the physical indirect index map stores the block indexes corresponding to the index data points. A difference is that the virtual indirect index map stores a volumetric lightmap block having the highest block precision at the index data points. If a volumetric lightmap block with the highest block precision at the index data points is not loaded, index information, that is, a block index of a volumetric lightmap block having the lowest precision level at the index data points is stored in the physical indirect index map. In other words, for an index data point at which the volumetric lightmap block having the highest precision level is not loaded, the physical indirect index map stores index information, that is, a block index of a volumetric lightmap block having the lowest precision level at the index data points.

In this embodiment, because illumination conditions of the index data points adjacent to the pixel point are similar to illumination conditions at the pixel point, the preset illumination information storage blocks pointed by the block indexes of the index data points adjacent to the pixel point are determined as the first illumination information storage blocks adjacent to the pixel point, so that accuracy of determining the first illumination information storage blocks adjacent to the pixel point can be improved.

In some embodiments, the performing deduplication processing based on the first illumination information storage blocks to obtain the associated illumination information storage block of the target image includes: selecting a second illumination information storage block adjacent to a key object in the target image from the plurality of preset illumination information storage blocks; and performing deduplication processing based on the first illumination information storage blocks and the second illumination information storage block to obtain the associated illumination information storage block of the target image.

The second illumination information storage block is a preset illumination information storage block adjacent to the key object, and the key object may have at least one adjacent second illumination information storage block. The deduplication processing is to remove identical illumination information storage blocks and retain different illumination information storage blocks.

Specifically, the terminal may determine the second illumination information storage block adjacent to the key object from the plurality of preset illumination information storage blocks based on the space area occupied by the key object in the target image in the three-dimensional world space. For example, when the block area of the preset illumination information storage block intersects with the space area occupied by the key object in the three-dimensional world space, the preset illumination information storage blocks is determined as the second illumination information storage block adjacent to the key object. Alternatively, when a distance between the block area of the preset illumination information storage block and the space area occupied by the key object in the three-dimensional world space is less than the second distance threshold, the preset illumination information storage block is determined as the second illumination information storage block adjacent to the key object.

In some embodiments, the terminal may select all different illumination information storage blocks from the first illumination information storage blocks and the second illumination information storage block to obtain the associated illumination information storage block of the target image.

In this embodiment, because the key object in the target image is an important object and a translucent object in the target image, an illumination effect on the key object is a relatively important part of an overall illumination effect on the target image. In addition, the second illumination information storage block adjacent to the key object has a great impact on the illumination effect of the key object. Therefore, the associated illumination information storage block is determined based on the first illumination information storage block adjacent to the pixel point and the second illumination information storage block adjacent to the key object. In this case, each associated illumination information storage block may include an illumination information storage block related to an opaque object in the target image and an illumination information storage block related to the key object, so that properness of the associated illumination information storage block can be improved.

In some embodiments, the selecting a second illumination information storage block adjacent to a key object in the target image from the plurality of preset illumination information storage blocks includes: determining a key object area of the key object in the target image, the key object area being an area in which the key object in the target image is located; and determining, from the plurality of preset illumination information storage blocks, a preset illumination information storage block intersecting with the key object area to obtain the second illumination information storage block.

The key object area of the key object is the space area in which the key object is located in the three-dimensional world space. For example, the key object area may be a bounding box of the key object.

Specifically, the terminal may determine, from the plurality of preset illumination information storage blocks, a preset illumination information storage block in which the block area intersects with the key object area to obtain the second illumination information storage block. For example, when the block area of the preset illumination information storage block intersects with the key object area, the preset illumination information storage block is determined as the second illumination information storage block adjacent to the key object.

In this embodiment, the preset illumination information storage block intersecting with the key object area is determined from the plurality of preset illumination information storage blocks to obtain the second illumination information storage block, and in this way, properness of the second illumination information storage block is improved.

In some embodiments, the associated illumination information storage block includes a plurality of illumination information storage units. The determining the candidate illumination information storage block based on the associated illumination information storage block includes: determining block precision of the associated illumination information storage block, the block precision being related to distribution density of the plurality of illumination information storage units; and filtering each associated illumination information storage block based on the block precision to obtain the candidate illumination information storage block, the candidate illumination information storage block being a remaining associated illumination information storage block after the filtering.

The illumination information storage block includes a plurality of illumination information storage units. A plurality of illumination information storage units mean at least two illumination information storage units, for example, 64 illumination information storage units. The illumination information storage units in the illumination information storage block are evenly distributed in the three-dimensional world space, and the intervals between adjacent illumination information storage units are the same. The block precision of the illumination information storage block is related to the distribution density of the illumination information storage units in the illumination information storage block. The denser distribution of the illumination information storage units in the illumination information storage block, for example, the smaller interval between adjacent illumination information storage units, the higher block precision, otherwise, the lower block precision. In other words, the block precision of the illumination information storage block is in positive correlation with the distribution density of the illumination information storage units in the illumination information storage block. The distribution density of the plurality of illumination information storage units is density of the plurality of illumination information storage units in the three-dimensional world space. The interval between adjacent illumination information storage units may be used to reflect the density. A smaller interval indicates higher density.

Specifically, the terminal may filter the associated illumination information storage blocks based on the block precision, and determine the remaining associated illumination information storage blocks as the candidate illumination information storage blocks. The terminal may store the preset illumination information storage block having the lowest precision level in the memory of the GPU for a long time. In a process of dynamically loading the illumination information storage block, only the preset illumination information storage block of which block precision is higher than the lowest precision level is loaded. In this case, the terminal may filter out the candidate illumination information storage blocks of which block precision is the lowest precision level from the associated illumination information storage blocks, and determine the remaining associated illumination information storage blocks as the candidate illumination information storage blocks. In other words, the candidate illumination information storage block is an illumination information storage block having the highest precision level or the medium precision level. Therefore, during loading, the preset illumination information storage block having a block precision higher than the lowest precision level is dynamically loaded.

In this embodiment, because the block precision is related to the distribution density of the illumination information storage units in the associated illumination information storage block, the associated illumination information storage blocks are filtered based on the block precision, and the associated illumination information storage blocks of which block precision does not meet a requirement may be filtered out, to improve properness of the candidate illumination information storage block.

In some embodiments, the at least one candidate illumination information storage block includes a first candidate illumination information storage block adjacent to at least one pixel point in the target image. The determining a storage block weight corresponding to the at least one candidate illumination information storage block includes: determining a pixel block weight of the first candidate illumination information storage block at each corresponding adjacent pixel point; and collecting statistics of each pixel block weight to obtain a storage block weight of the first candidate illumination information storage block.

Each candidate illumination information storage block has a storage block weight. The first candidate illumination information storage block corresponds to at least one adjacent pixel point. The pixel block weight represents a degree of an impact of the first candidate illumination information storage block on illumination of the adjacent pixel point. A higher pixel block weight indicates a greater impact.

Specifically, for each pixel point, the terminal may determine the first illumination information storage blocks adjacent to each pixel point from the plurality of preset illumination information storage blocks, and perform deduplication processing on the first illumination information storage blocks to obtain the remaining first illumination information storage blocks after the deduplication processing. The first candidate illumination information storage block is the remaining first illumination information storage blocks after the deduplication processing. An operation of determining an adjacent pixel point of the first candidate illumination information storage block includes: If the first illumination information storage block adjacent to the pixel point is the first candidate illumination information storage block, then the pixel point is the adjacent pixel point of the first candidate illumination information storage block. For example, the remaining first illumination information storage blocks after the deduplication processing are S1 and S2. If the first candidate illumination information storage block is S1, and the first illumination information storage blocks adjacent to a pixel point A, a pixel point B, and a pixel point C are all S1, the pixel point A, the pixel point B, and the pixel point C are all adjacent pixel points of the first candidate illumination information storage block S1.

In some embodiments, the terminal may calculate the pixel block weight based on a depth value of the first candidate illumination information storage block, and the pixel block weight is in negative correlation with the depth value of the first candidate illumination information storage block. The terminal may further determine the pixel block weight based on the depth value of the first candidate illumination information storage block and a shadow factor of the first candidate illumination information storage block. The pixel block weight is in positive correlation with the shadow factor. The positive correlation means that when other conditions remain unchanged, two variables change in the same direction, and when one variable changes from large to small, the other variable also changes from large to small. The terminal may determine a weight of the shadow factor to obtain a shadow weight coefficient, determine a weight of the depth value of the first candidate illumination information storage block to obtain a depth weight coefficient, and perform weighted calculation on the shadow factor and the depth value by using the shadow weight coefficient and the depth weight coefficient to obtain a pixel block weight. The shadow weight coefficient and the depth weight coefficient are preset values.

In some embodiments, for the first candidate illumination information storage blocks, the terminal may sum the pixel block weights of the adjacent pixel points corresponding to the first candidate illumination information storage blocks, and determine the storage block weight of the first candidate illumination information storage block based on a summation result. For example, the terminal may determine the summation result as the storage block weight of the first candidate illumination information storage block.

In some embodiments, the terminal may calculate the pixel block weight based on the depth value of the adjacent pixel point, and the pixel block weight is in negative correlation with the depth value of the adjacent pixel point. The terminal may further determine the pixel block weight based on the depth value of the adjacent pixel point and a shadow area in the block area of the first candidate illumination information storage block. For example, the terminal may calculate a ratio of a size of the shadow area to a size of the block area, and determine the calculated ratio as the shadow factor of the first candidate illumination information storage block. The pixel block weight is in positive correlation with the shadow factor. For example, the terminal may determine a weight of the shadow factor to obtain a shadow weight coefficient, determine a weight of a depth value of the adjacent pixel point to obtain a depth weight coefficient, and perform weighted calculation on the shadow factor and the depth value of the adjacent pixel point by using the shadow weight coefficient and the depth weight coefficient to obtain a pixel block weight. The shadow weight coefficient and the depth weight coefficient are preset values. The depth value may be a normalized depth value, and the normalized depth value of the first candidate illumination information storage block is calculated based on a location of the first candidate illumination information storage block. For example, a pixel block weight=a shadow factor×a shadow weight coefficient+(1−a normalized depth value)×a depth weight coefficient. The shadow factor may be pre-baked. The weight in this application may be calculated using a shadow factor×a shadow weight coefficient+(1−a normalized depth value)×a depth weight coefficient. A difference is that values of the shadow factor, the normalized depth value, the shadow weight coefficient, and the depth weight coefficient are determined based on actual needs.

In this embodiment, because a higher pixel block weight indicates a greater illumination impact on the pixel point, determining the pixel block weight of the first candidate illumination information storage block at each corresponding adjacent pixel point and collecting statistics of the pixel block weights to obtain the storage block weight of the first candidate illumination information storage block enables the storage block weight to reflect a degree of an impact of the first candidate illumination information storage block on the illumination effect in the target image, thereby improving properness of the storage block weight.

In some embodiments, the first candidate illumination information storage block is adjacent to a key object area. The key object area being an area in which a key object in the target image is located. The collecting statistics of each pixel block weight to obtain a storage block weight of the first candidate illumination information storage block includes: collecting the statistics of each pixel block weight to obtain a first block weight of the first candidate illumination information storage block; determining a second block weight of the first candidate illumination information storage block based on a depth value of the first candidate illumination information storage block; and obtaining the storage block weight of the first candidate illumination information storage block based on the first block weight and the second block weight of the first candidate illumination information storage block.

Specifically, the terminal may sum the pixel block weights, and determine a summation result as the first block weight of the first candidate illumination information storage block. The terminal may determine the second block weight of the first candidate illumination information storage block based on the depth value of the first candidate illumination information storage block. The second block weight is in negative correlation with the depth value of the first candidate illumination information storage block. The terminal may further determine the second block weight based on the depth value of the first candidate illumination information storage block and the shadow factor of the first candidate illumination information storage block. The second block weight is in positive correlation with the shadow factor.

In some embodiments, the terminal may determine the weight of the shadow factor of the first candidate illumination information storage block to obtain a shadow weight coefficient, determine a weight of the depth value of the first candidate illumination information storage block to obtain a depth weight coefficient, and perform weighted calculation on the shadow factor and the depth value by using the shadow weight coefficient and the depth weight coefficient to obtain the second block weight of the first candidate illumination information storage block. The shadow weight coefficient and the depth weight coefficient are preset values. In this embodiment, because both the shadow factor and the depth value are related to the illumination effect, determining the second block weight based on the shadow factor and the depth value improves accuracy of the second block weight.

In some embodiments, the terminal may sum the first block weight and the second block weight of the first candidate illumination information storage block, and determine a summation result as the storage block weight of the first candidate illumination information storage block.

In this embodiment, because the depth value of the illumination information storage block affects the illumination effect, determining the second block weight of the first candidate illumination information storage block based on the depth value of the first candidate illumination information storage block and obtaining the storage block weight of the first candidate illumination information storage block based on the first block weight and the second block weight of the first candidate illumination information storage block improve properness of the storage block weight.

In some embodiments, the target image is a target video frame. The determining a pixel block weight of the first candidate illumination information storage block at each corresponding adjacent pixel point includes: determining a depth value of each adjacent pixel point based on a forward video frame of the target video frame; and determining the pixel block weight of the first candidate illumination information storage block at each adjacent pixel point based on the depth value of each adjacent pixel point.

The target video frame may be any to-be-rendered video frame, such as a current to-be-rendered video frame in a game. The forward video frame of the target video frame is an adjacent video frame before the target video frame.

Specifically, for each adjacent pixel point, the terminal may determine a depth value of an adjacent pixel point in the forward video frame of the target video frame as the depth value of the adjacent pixel point to obtain a depth value of each adjacent pixel point. In other words, for each adjacent pixel point, the terminal may determine a location of the adjacent pixel point in the target video frame to obtain a target location, and determine the depth value of the pixel point at the target location in the forward video frame as the depth value of the adjacent pixel point. For example, if an adjacent pixel point is a pixel point at a location A in the target video frame, the terminal may determine a depth value of the pixel point at the location A in the forward video frame as the depth value of the adjacent pixel point. For each adjacent pixel point, the pixel block weight is in negative correlation with the depth value of the adjacent pixel point. Because the depth value of the pixel point in the forward video frame of the target video frame is generated before the target video frame is rendered, and a change in the depth value of the pixel point in two adjacent frames is small, determining the pixel block weight by using the depth value of the pixel point in the forward video frame can improve efficiency of generating the pixel block weight while ensuring properness of the pixel block weight.

In this embodiment, the depth value of each adjacent pixel point is determined based on the forward video frame of the target video frame, and the pixel block weight of the first candidate illumination information storage block at each adjacent pixel point is determined based on the depth value of each adjacent pixel point. Because the depth value of the pixel point in the forward video frame of the target video frame is generated before the target video frame is rendered, and a change in the depth value of the pixel point in two adjacent frames is small, determining the pixel block weight by using the depth value of the pixel point in the forward video frame can improve efficiency of generating the pixel block weight while ensuring properness of the pixel block weight.

In some embodiments, the at least one candidate illumination information storage block includes a second candidate illumination information storage block, a block area of the second candidate illumination information storage block is adjacent to a key object area, and the key object area is an area in which a key object in the target image is located. The determining a storage block weight corresponding to the at least one candidate illumination information storage block includes: obtaining a shadow factor of the second candidate illumination information storage block, the shadow factor being determined based on a proportion of a shadow area in the block area of the second candidate illumination information storage block; and determining a storage block weight of the second candidate illumination information storage block based on the shadow factor.

Specifically, the terminal may calculate a ratio of a size of the shadow area to a size of the block area, and determine the calculated ratio as the shadow factor of the second candidate illumination information storage block. The storage block weight of the second candidate illumination information storage block is in positive correlation with the shadow factor.

In some embodiments, the terminal may determine the storage block weight of the second candidate illumination information storage block based on a depth value of the second candidate illumination information storage block. The terminal may further determine the storage block weight based on the depth value of the second candidate illumination information storage block and the shadow factor of the second candidate illumination information storage block. The storage block weight is in negative correlation with the depth value of the second candidate illumination information storage block. The storage block weight is in positive correlation with the shadow factor of the second candidate illumination information storage block. The terminal may determine a weight of the shadow factor of the second candidate illumination information storage block to obtain a shadow weight coefficient, determine a weight of the depth value of the second candidate illumination information storage block to obtain a depth weight coefficient, and perform weighted calculation on the shadow factor and the depth value of the second candidate illumination information storage block by using the shadow weight coefficient and the depth weight coefficient to obtain the storage block weight. The shadow weight coefficient and the depth weight coefficient are preset values. Because the key object is a main object in the target image, the shadow weight coefficient used when the storage block weight of the second candidate illumination information storage block is calculated may be greater than the shadow weight coefficient used when the first block weight is calculated. The depth weight coefficient used when the storage block weight of the second candidate illumination information storage block is calculated may be greater than the depth weight coefficient used when the first block weight is calculated.

In this embodiment, because proportion of global illumination (GI) contribution in a shadow is high, and the storage block weight is in positive correlation with the shadow factor, determining the storage block weight based on the shadow factor can increase a weight of an illumination information storage block having the global illumination contribution, improve properness of the storage block weight, and improve an illumination effect.

In some embodiments, the illumination information storage block is a volumetric lightmap block, and the volumetric lightmap block includes a plurality of light probes. The illumination information loading method further includes: determining, from a plurality of loaded volumetric lightmap blocks, a loaded volumetric lightmap block adjacent to each pixel point in the target image, the plurality of loaded volumetric lightmap blocks including the loaded illumination information storage block; determining, from the loaded volumetric lightmap block corresponding to each pixel point, a light probe adjacent to each pixel point; and determining illumination information of each pixel point by using the light probe adjacent to each pixel point, and performing illumination calculation based on the illumination information of each pixel point to perform rendering, so as to obtain the target image.

The plurality of loaded volumetric lightmap blocks include loaded volumetric lightmap blocks. The loaded volumetric lightmap block is a successfully loaded volumetric lightmap block in the at least one candidate volumetric lightmap block. When a preset volumetric lightmap block having the lowest precision level is permanently loaded in the memory of the GPU of the terminal, the plurality of loaded volumetric lightmap blocks further include the preset volumetric lightmap block having the lowest precision level.

The volumetric lightmap block includes the plurality of light probes. The light probes correspond to three-dimensional world space locations. The light probes store illumination information at the three-dimensional world space locations corresponding to the light probes.

Specifically, when determining the volumetric lightmap block adjacent to the pixel point, the terminal may determine the light probe adjacent to the pixel point from light probes included in the volumetric lightmap block adjacent to the pixel point, perform calculation based on the illumination information stored in the light probe adjacent to the pixel point to obtain the illumination information corresponding to the pixel point, and perform illumination calculation based on the illumination information of each pixel point to perform rendering, so as to obtain the target image.

In some embodiments, for the light probe adjacent to the pixel point in the volumetric lightmap block, the terminal may calculate a distance between the three-dimensional world space location of the pixel point and the three-dimensional world space location of the light probe, and determine a light probe for which the distance is less than a first distance threshold as the light probe adjacent to the pixel point. The first distance threshold may be preset or set based on needs. Alternatively, the terminal may arrange the light probes in descending order of distances to obtain a storage unit sequence, and determine light probes arranged before a preset order in the storage unit sequence as the light probes adjacent to the pixel point. The preset order may be set based on needs.

In some embodiments, the loaded volumetric lightmap block is stored in the physical volumetric lightmap. For each pixel point, the physical indirect index map stores the block indexes respectively corresponding to the plurality of index data points. A volumetric lightmap block represented by the block index corresponding to the index data point is the loaded volumetric lightmap block. The terminal may sample the physical indirect index map based on world coordinates of the pixel point, to be specific, determines, from the physical indirect index map, a block index of an index data point adjacent to the pixel point and an interval between adjacent sampling points to obtain a target block index corresponding to the pixel point; determines, based on the block index and the interval between adjacent sampling points, a location of a light probe in a corresponding volumetric lightmap (such as UV (texture) coordinates) and samples the volumetric lightmap, to be specific, determines the light probe adjacent to the pixel point from the sampled volumetric lightmap; and perform interpolation by using the illumination information in the light probe adjacent to the pixel point to obtain the illumination information (such as a sphere harmonic coefficient) of the pixel point.

Because volumetric lightmap blocks required for rendering different images may be different, in a process of rendering a plurality of different images, the physical volumetric lightmap and the physical indirect index map need to be continuously updated. In an update process, if a volumetric lightmap block having the highest block precision level at an index data point is not loaded, data of the physical indirect index map can be controlled to point to a corresponding volumetric lightmap block having the lowest precision level, so as to achieve a coarse-grained global illumination effect.

In this embodiment, because the illumination information in the light probe adjacent to the pixel point is similar to real illumination information of the pixel point, the light probe adjacent to each pixel point is determined from the loaded volumetric lightmap block corresponding to each pixel point. The light probe adjacent to each pixel point is used to determine illumination information of each pixel point, and illumination calculation is performed based on the illumination information of each pixel point to perform rendering, so as to obtain the target image. In this way, a rendering effect can be improved.

Figure 4:
FIG. 4 is a schematic flowchart of an illumination information loading method according to some embodiments.

In some embodiments, as shown in FIG. 4, an illumination information loading method is provided. The method may be performed by a terminal or a server, or may be performed jointly by a terminal and a server. An example in which the method is applied to the terminal is used for description. The method includes the following operations:

Operation 402: Obtain a virtual volumetric lightmap, the virtual volumetric lightmap including a plurality of volumetric lightmap blocks.

Operation 404: Obtain a virtual indirect index map, block indexes respectively corresponding to a plurality of index data points being stored in the virtual indirect index map, and the block indexes being in one-to-one correspondence with the volumetric lightmap blocks.

Operation 406: Determine, for each pixel point in screen space, world coordinates of the pixel point based on a depth value of the pixel point in a previous frame.

Operation 408: Select, based on the world coordinates of the pixel point from the virtual indirect index map, a block index corresponding to an index data point of which world coordinates are close to the world coordinates of the pixel point to obtain a target block index corresponding to the pixel point.

Operation 410: Determine an illumination information storage block pointed by the target block index of the pixel point as a first illumination information storage block adjacent to the pixel point.

Operation 412: Calculate, based on the depth value of the pixel point in the previous frame, a pixel block weight of a first volumetric lightmap block corresponding to each pixel point.

Figures 5, 6:
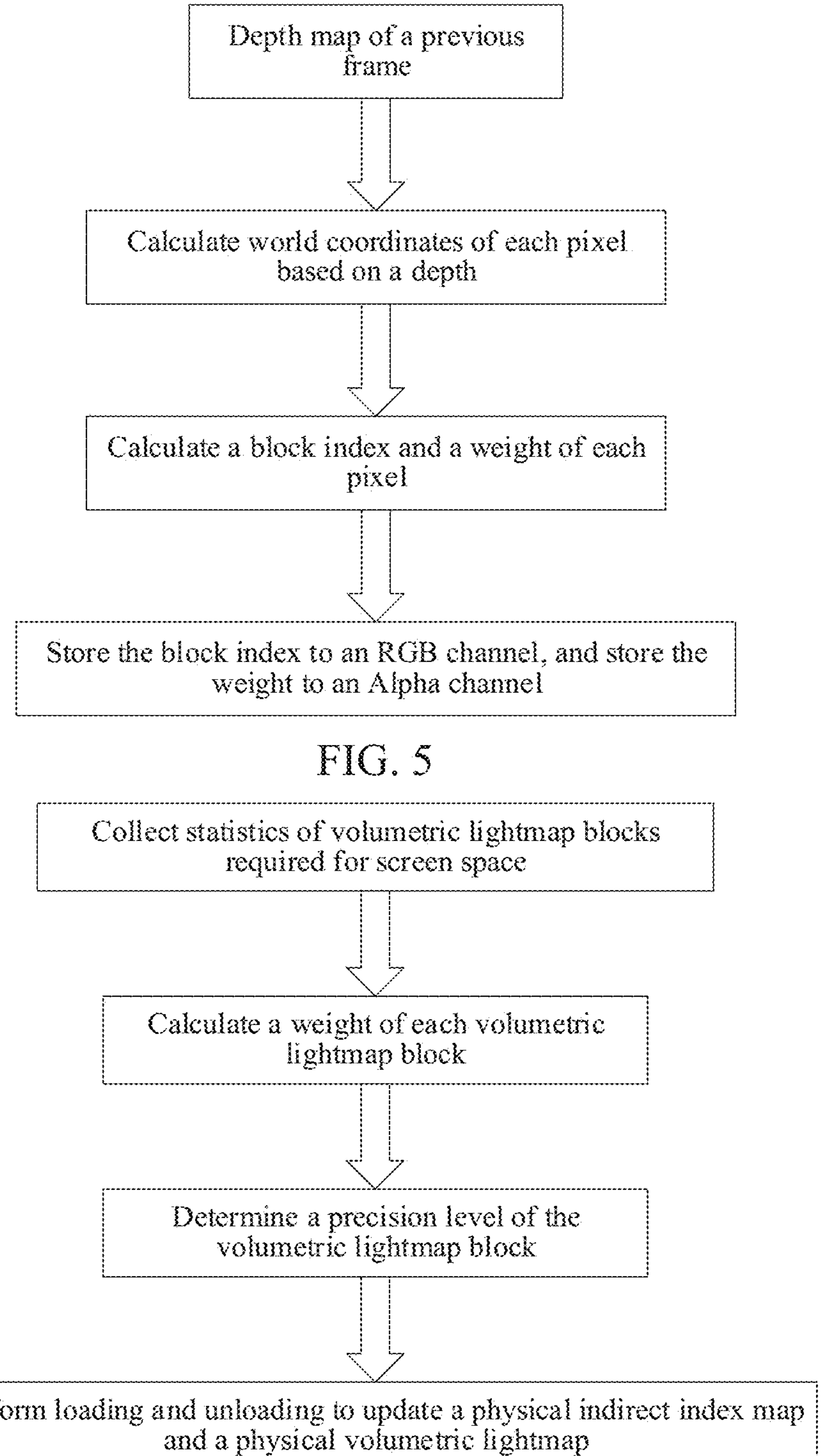
FIG. 5 is a schematic diagram of calculating a block index and a weight according to some embodiments.
FIG. 6 is a schematic diagram of loading illumination information according to some embodiments.

The terminal may store a first block index and the pixel block weight corresponding to each pixel point in a map of four channels, namely RGBA. As shown in FIG. 5, a block index is stored in an RGB channel, and a weight is stored in an Alpha channel. In the RGBA, A stands for Alpha, R stands for Red, G stands for Green, and B stands for Blue. In post-processing at the end of each frame, the volumetric lightmap blocks and the weights required for the pixel points are collected based on depth map information. In a GPU, a compute shader or a post-processing shader is used to perform statistics collection and calculation. An output rendered target map is read at the beginning of a next frame.

Operation 414: Determine a bounding box of a key object in a to-be-rendered current video frame, and determine, from the plurality of volumetric lightmap blocks pre-generated in a virtual scene, different volumetric lightmap blocks intersecting with the bounding box to obtain second volumetric lightmap blocks.

Operation 416: Calculate, based on a depth value of each second volumetric lightmap block, a second block weight corresponding to each second volumetric lightmap block.

Operation 418: Determine different volumetric lightmap blocks from the first volumetric lightmap blocks and the second volumetric lightmap blocks to obtain associated volumetric lightmap blocks of the to-be-rendered current video frame.

Operation 420: Add target block weights corresponding to the associated volumetric lightmap blocks together to obtain storage block weights of the associated volumetric lightmap blocks.

When there are both the pixel block weights and the second block weights in the associated volumetric lightmap blocks, there are a plurality of target block weights, including the pixel block weights and the second block weights. When there are only the pixel block weights in the associated volumetric lightmap blocks, the target block weights are the pixel block weights. When there are only the second block weights in the associated volumetric lightmap blocks, the target block weights are the second block weights.

Operation 422: Filter the associated volumetric lightmap blocks based on block precision, and determine a remaining associated volumetric lightmap block after the filtering as a candidate volumetric lightmap block.

Operation 424: Determine a to-be-loaded volumetric lightmap block from each candidate volumetric lightmap block based on the storage block weights, and when there is free block storage space, update a physical volumetric lightmap block and a physical indirect index map by using the to-be-loaded volumetric lightmap block to complete loading of the to-be-loaded volumetric lightmap block, and the loading stops until there is no free block storage space.

FIG. 6 show an entire process of loading a volumetric lightmap block. The loading and unloading in FIG. 6 may be least recently used (LRU) loading and unloading.

In some embodiments, the terminal may store loading information respectively corresponding to each volumetric lightmap block in the virtual volumetric lightmap, and each volumetric lightmap block in the physical volumetric lightmap corresponds to an LRUNode (referred to as a node). The LRUNode is a component element of a doubly linked list LRUList, and all LRUNodes in the LRUList are ordered. The loading information includes a storage block weight and a node pointer of the LRUNode in the LRUList. The node pointer is configured for uniquely identifying the LRUNode, and different LRUNodes have different node pointers. The LRUNode stores a node pointer of a previous LRUNode of the LRUNode in the LRUList, a node pointer of a next LRUNode of the LRUNode in the LRUList, volumetric lightmap block coordinates of the volumetric lightmap block in the virtual volumetric lightmap, volumetric lightmap block coordinates of the volumetric lightmap block in the physical volumetric lightmap, and last recently using time of the volumetric lightmap block and a loading state of the volumetric lightmap block. The loading state of the volumetric lightmap block is configured for indicating whether the volumetric lightmap block is loaded into the physical volumetric lightmap. For example, the loading state being 0 indicates that the volumetric lightmap block is not loaded, and the loading state being 1 indicates that the volumetric lightmap block is loaded.

In some embodiments, the terminal may traverse loading information of each virtual volumetric lightmap block to obtain the storage block weights from the loading information. If the storage block weights of the associated volumetric lightmaps in the virtual volumetric lightmap blocks are greater than 0, the terminal may obtain, from each virtual volumetric lightmaps, a virtual volumetric lightmap block having a storage block weight is greater than 0 and having a precision level that is not the lowest, to obtain the to-be-loaded volumetric lightmap block. If a quantity of to-be-loaded volumetric lightmap blocks is less than or equal to a quantity of volumetric lightmap blocks that can be loaded, all to-be-loaded volumetric lightmap blocks are loaded. If a quantity of to-be-loaded volumetric lightmap blocks is greater than a quantity of volumetric lightmap blocks that can be loaded, the volumetric lightmap blocks are loaded based on weights in descending order. For a part exceeding a capacity, a default volumetric lightmap block having the lowest precision level is used.

In some embodiments, for each target illumination information storage block, the terminal may determine, based on the LRUList, whether the target illumination information storage block is loaded. In other words, the terminal determines whether there is an LRUNode corresponding to the target illumination information storage block in the LRUList. If there is an LRUNode corresponding to the target illumination information storage block in the LRUList, it is determined that the target illumination information storage block is loaded, then the LRUNode corresponding to the target illumination information storage block is moved to the head of the LRUList, and update the last recently using time. If the target illumination information storage block is not loaded, the LRUNode at the end of the LRUList is pointed to a CurNode (a current node), data in CurNode is unloaded, and information of the target illumination information storage block is loaded into the CurNode. Operations of unloading the data in the CurNode include: setting volumetric lightmap block coordinates in the CurNode in the physical volumetric lightmap to volumetric lightmap block coordinates of the volumetric lightmap block with the lowest precision in the physical volumetric lightmap; updating the loading state to not loaded; and clearing the node pointers in the loading information. Operation of loading the information of the target illumination information storage block (that is, a newly loaded volumetric lightmap block) into the CurNode include: loading the target illumination information storage block into a physical volumetric lightmap area corresponding to physical volumetric lightmap block coordinates in the CurNode, where the physical volumetric lightmap block coordinates are the volumetric lightmap block coordinates of the volumetric lightmap block in the physical volumetric lightmap; updating information in a corresponding physical indirect index map to point to the newly loaded volumetric lightmap block; updating virtual volumetric lightmap block coordinates in the CurNode to virtual volumetric lightmap block coordinates of the newly loaded volumetric lightmap block, where the virtual volumetric lightmap block coordinates are volumetric lightmap block coordinates of the volumetric lightmap block in the virtual volumetric lightmap; updating node pointers in loading information corresponding to the newly loaded volumetric lightmap block to the node pointers of the CurNode; updating the last recently using time in the CurNode; and updating the loading state to loaded. After loading the information into the CurNode, the terminal moves the CurNode to the head of the LRUList. If the target illumination information storage block cannot be loaded, for example, if there is insufficient storage space, no operation is performed, and a permanently loaded volumetric lightmap block having the lowest precision level is directly used.

Operation 426: Determine a loaded volumetric lightmap block adjacent to each pixel point by using the physical indirect index map.

Operation 428: Sample the loaded volumetric lightmap block adjacent to the pixel point to obtain illumination information corresponding to the pixel point.

Operation 430: Perform light rendering by using the illumination information corresponding to each pixel point to obtain a current video frame.

In this embodiment, a method for dynamically loading and managing a volumetric lightmap is implemented in this application. An important element and a secondary element are distinguished. The important element is a key object, such as a main character and an important translucent object. A required volumetric lightmap block and weight are calculated based on a location and a bounding box of the element in a current frame. The secondary element is an opaque object other than the important element. The volumetric lightmap block and weight required for the current frame are estimated based on depth information of screen space of a previous frame. If all volumetric lightmap blocks that need to be loaded do not exceed an available physical volumetric lightmap block capacity, all volumetric lightmap blocks are loaded. If all volumetric lightmap blocks that need to be loaded exceed the available physical volumetric lightmap block capacity, all volumetric lightmap blocks are loaded in an order of weights. For example, the available physical volumetric lightmap block capacity is a capacity for storing N volumetric lightmap blocks, and in this case, volumetric lightmap blocks having the first N weights are loaded. For parts exceeding exceeds the capacity, a default volumetric lightmap block having the lowest precision level is used. In this way, overhead of a memory of the GPU for the volumetric lightmaps can be reduced, and precision levels of the volumetric lightmaps are controlled based on the weights of the volumetric lightmap blocks, to balance memory overhead and effect precision of the volumetric lightmaps, thereby achieving a good illumination effect of a game within a specific memory budget. If the method is applied to precomputed radiance transfer (PRT) global illumination, relighting computation may be performed on a visible volumetric lightmap block in a current picture, and computational overhead of relighting can be reduced.

Figure 7:
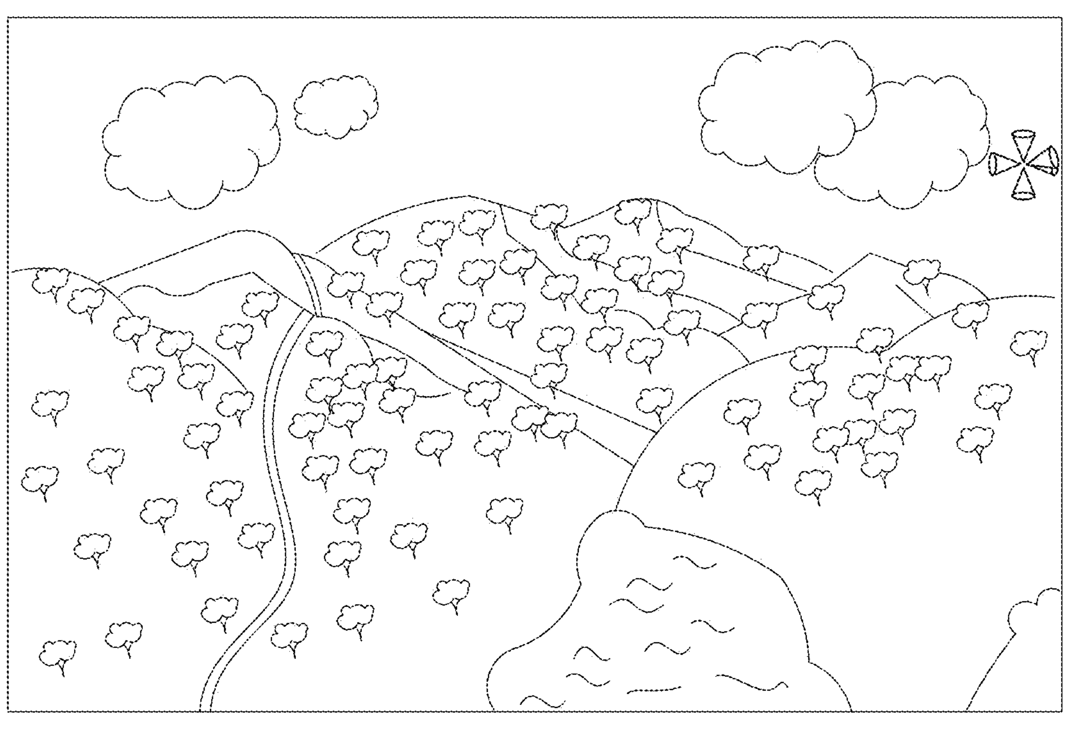
FIG. 7 is an effect diagram of a rendered image according to some embodiments.

To prove an effect of the illumination information loading method provided in this application, the illumination information loading method provided in this application is used to load illumination information and perform image rendering. FIG. 7 shows an image rendered with sufficient volumetric lightmaps and memory budgets. In this case, a scene range covered by a volumetric lightmap is (384, 448, 192) m, and a distance between adjacent sampling points in a volumetric lightmap block having the highest precision is 1 m. Pre-baked data produces 42,523 volumetric lightmap blocks having the highest precision, 2,139 volumetric lightmap blocks having medium precision, and 126 volumetric lightmap blocks having the lowest precision. A current camera perspective basically covers the entire volumetric lightmap. A window size is 1280×720 (pixels). If the memory budget is sufficient, in other words, each pixel uses an available volumetric lightmap block having the highest precision, a total of 8,843 volumetric lightmap blocks need to be loaded. Compared with loading all volumetric lightmap blocks, memory overhead is only 20% of original overhead, so that a storage resource can be saved, and an illumination effect remains unchanged.

Figure 8:
FIG. 8 is an effect diagram of a rendered image according to some embodiments.

If the memory budget is insufficient, a quantity of loaded volumetric lightmap blocks having the highest precision is limited to 6,600. Some volumetric lightmap blocks having a small weight uses the volumetric lightmap blocks having the lowest precision. FIG. 8 shows an image rendered with insufficient memory budgets. Although an effect in FIG. 8 is slightly worse than an original effect (in other words, when all volumetric lightmap blocks are loaded), because weights of volumetric lightmap blocks having the lowest precision used are small, an effect is limited, and the memory overhead of the volumetric lightmap is only 15% of the original overhead, so that storage resources are saved.

Figure 9:
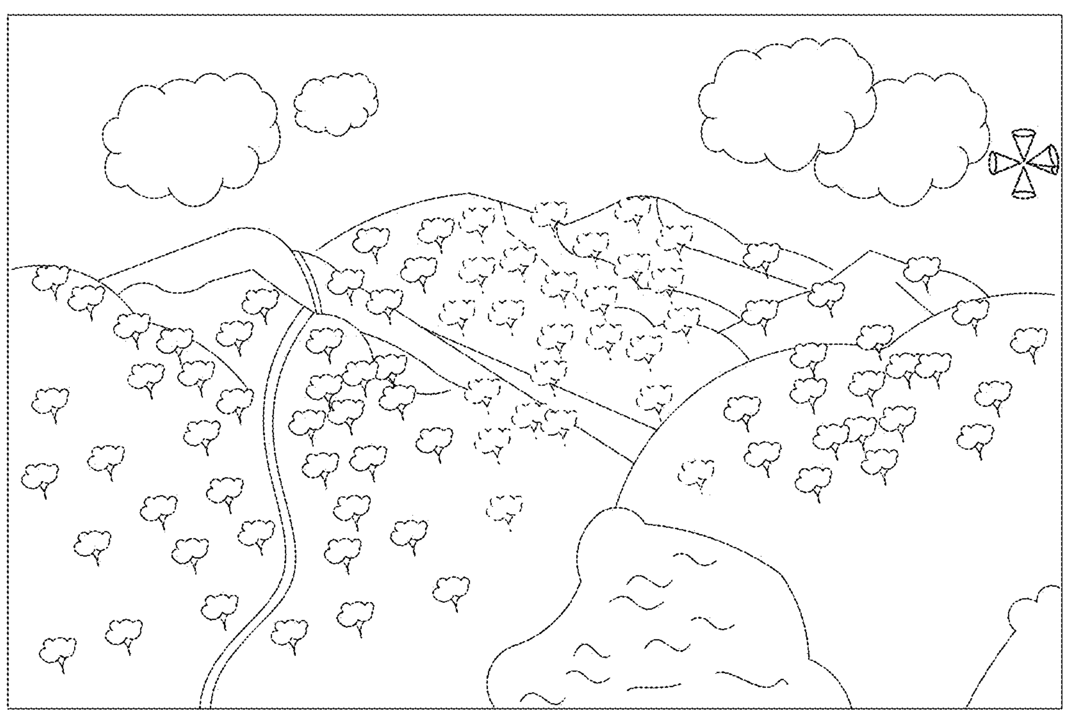
FIG. 9 is an effect diagram of a rendered image according to some embodiments.

If the memory budget is severely insufficient, a quantity of loaded volumetric lightmap blocks having the highest precision is limited to 4,200. A half or more of volumetric lightmap blocks having a small weight need to use the volumetric lightmap blocks having the lowest precision. The memory overhead of the volumetric lightmap is only 10% of the original overhead, so that storage resources can be saved. FIG. 9 shows an image rendered when memory budgets are severely insufficient. Because more volumetric lightmap blocks use volumetric lightmap blocks having the lowest precision, an effect is clear. However, due to weight adjustment, an effect loss is reduced to a very low level.

Figure 10:
FIG. 10 is an effect diagram of a rendered image according to some embodiments.

For comparison, a quantity of loaded volumetric lightmap blocks having the highest precision is also limited to 4,200, but weights of volumetric lightmap blocks of all pixel points are the same, and the weights of the volumetric lightmap blocks are only determined based on a quantity of screen space pixels occupied by the volumetric lightmap blocks. An effect as shown in FIG. 10, it may be found that a global illumination effect on a distant mountain top is poor.

The illumination information loading method provided in this application may be applied in any scene that needs to load illumination information, including but not limited to at least one of scenes such as film and television special effects, visual design, games, animation, virtual reality (VR), industrial simulation, or digital cultural creation. The illumination information loading method provided in this application may be applied in scenes such as film and television special effects, visual design, games, animation, virtual reality, industrial simulation, or digital cultural creation. Storage resources occupied by loaded illumination information in a GPU can be saved while ensuring an illumination effect. For example, in a process of making a digital cultural and creative product, the illumination information loading method provided in this application may be applied in making an image of a digital cultural and creative product. For another example, the illumination information loading method provided in this application may be applied in making an image of a simulation device in the industrial simulation.

In a game scene, the illumination information loading method provided in this application may be applied in loading illumination information configured for performing rendering to obtain a video frame in the game. Specifically, when a terminal runs a game application, to render a video frame in the game, the terminal may determine at least one candidate illumination information storage block, where the candidate illumination information storage block is an illumination information storage block associated with a to-be-rendered video frame, determine a storage block weight corresponding to the at least one candidate illumination information storage block, determine a target illumination information storage block from the at least one candidate illumination information storage block based on the storage block weight, load the target illumination information storage block, and perform illumination calculation by using a loaded illumination information storage block to perform rendering, so as to obtain the video frame in the game. The terminal may display the rendered video frame.

In an animation scene, the illumination information loading method provided in this application may applied in loading illumination information configured for performing rendering to obtain an image in an animation. Specifically, in a process of making images in the animation, the terminal may determine at least one candidate illumination information storage block, where the candidate illumination information storage block is an illumination information storage block associated with a to-be-made image, determine a storage block weight corresponding to the at least one candidate illumination information storage block, determine a target illumination information storage block from the at least one candidate illumination information storage block based on the storage block weight, load the target illumination information storage block, and perform illumination calculation by using a loaded illumination information storage block to perform rendering, so as to obtain the image in the animation. The terminal may display the rendered image.

Although operations in flowcharts described in the foregoing embodiments are displayed in sequence as indicated by arrows, these operations are not necessarily performed in sequence as indicated by the arrows. Unless otherwise explicitly specified in this application, execution of the operations is not strictly limited, and the operations may be performed in other sequences. Moreover, at least part of the operations in each embodiment may include a plurality of operations or a plurality of stages. The operations or stages are not necessarily performed at the same moment but may be performed at different moments. Execution of the operations or stages is not necessarily performed in sequence, but may be performed alternately with other operations or at least part of operations or stages of other operations.

Based on the same inventive concept, an embodiment of this application further provides an illumination information loading apparatus for implementing the foregoing illumination information loading method. An implementation for resolving problems provided in the apparatus is similar to the implementation described in the foregoing method. Therefore, for specific limitations of the following one or more illumination information loading apparatus embodiments, reference may be made to the foregoing limitations to the illumination information loading method, which is not limited herein.

Figure 11:
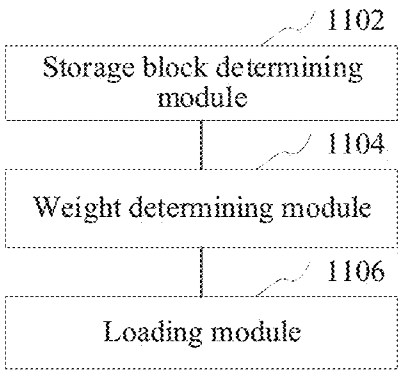
FIG. 11 is a block diagram of a structure of an illumination information loading apparatus according to some embodiments.

In some embodiments, as shown in FIG. 11, an illumination information loading apparatus is provided, including:

a storage block determining module 1102, a weight determining module 1104, and a loading module 1106.

The storage block determining module 1102 is configured to determine at least one candidate illumination information storage block. The candidate illumination information storage block is an illumination information storage block associated with a target image.

The weight determining module 1104 is configured to determine a storage block weight corresponding to the at least one candidate illumination information storage block.

The loading module 1106 is configured to: determine a target illumination information storage block from the at least one candidate illumination information storage block based on the storage block weight, and load the target illumination information storage block. A loaded illumination information storage block is configured for performing illumination calculation to perform rendering, so as to obtain a target image.

In some embodiments, the storage block determining module is further configured to: determine an associated illumination information storage block of the target image from a plurality of preset illumination information storage blocks; and determine the candidate illumination information storage block based on the associated illumination information storage block.

In some embodiments, the storage block determining module is further configured to: determine, from the plurality of preset illumination information storage blocks, first illumination information storage blocks respectively adjacent to a plurality of pixel points in the target image; and perform deduplication processing based on the first illumination information storage blocks to obtain the associated illumination information storage block of the target image.

In some embodiments, the storage block determining module is further configured to: obtain block indexes respectively corresponding to a plurality of index data points, the block indexes being in one-to-one correspondence to the preset illumination information storage blocks; select, for a pixel point among the plurality of pixel points, a block index corresponding to an index data point adjacent to the pixel point from the block indexes respectively corresponding to the plurality of index data points to obtain a target block index corresponding to the pixel point; and determine a preset illumination information storage block corresponding to the target block index as a first illumination information storage block adjacent to the pixel point.

In some embodiments, the storage block determining module is further configured to: select a second illumination information storage block adjacent to a key object in the target image from the plurality of preset illumination information storage blocks; and perform deduplication processing based on the first illumination information storage blocks and the second illumination information storage block to obtain the associated illumination information storage block of the target image.

In some embodiments, the storage block determining module is further configured to: determine a key object area of the key object in the target image, the key object area being an area in which the key object in the target image is located; and determine, from the plurality of preset illumination information storage blocks, a preset illumination information storage block intersecting with the key object area to obtain the second illumination information storage block.

In some embodiments, the associated illumination information storage block includes a plurality of illumination information storage units. The storage block determining module is further configured to: determine block precision of the associated illumination information storage block, the block precision being related to distribution density of the plurality of illumination information storage units; and filter each associated illumination information storage block based on the block precision to obtain the candidate illumination information storage block, the candidate illumination information storage block being a remaining associated illumination information storage block after the filtering.

In some embodiments, the at least one candidate illumination information storage block includes a first candidate illumination information storage block adjacent to at least one pixel point in the target image. The weight determining module is further configured to: determine a pixel block weight of the first candidate illumination information storage block at each corresponding adjacent pixel point; and collect statistics of each pixel block weight to obtain a storage block weight of the first candidate illumination information storage block.

In some embodiments, the first candidate illumination information storage block is adjacent to a key object area. The key object area is an area in which a key object in the target image is located. The weight determining module is further configured to: collect the statistics of each pixel block weight to obtain a first block weight of the first candidate illumination information storage block; determine a second block weight of the first candidate illumination information storage block based on a depth value of the first candidate illumination information storage block; and obtain the storage block weight of the first candidate illumination information storage block based on the first block weight and the second block weight of the first candidate illumination information storage block.

In some embodiments, the weight determining module is further configured to: determine a weight of a shadow factor of the first candidate illumination information storage block to obtain a shadow weight coefficient, and determine a weight of the depth value of the first candidate illumination information storage block to obtain a depth weight coefficient; and perform weighted calculation on the shadow factor and the depth value of the first candidate illumination information storage block by using the shadow weight coefficient and the depth weight coefficient to obtain the second block weight of the first candidate illumination information storage block.

In some embodiments, the target image is a target video frame. The weight determining module is further configured to: determine a depth value of each adjacent pixel point based on a forward video frame of the target video frame; and determine the pixel block weight of the first candidate illumination information storage block at each adjacent pixel point based on the depth value of each adjacent pixel point.

In some embodiments, the weight determining module is further configured to determine, for each adjacent pixel point, a depth value of an adjacent pixel point in the forward video frame of the target video frame as the depth value of the adjacent pixel point.

In some embodiments, the at least one candidate illumination information storage block includes a second candidate illumination information storage block, a block area of the second candidate illumination information storage block is adjacent to a key object area, and the key object area is an area in which a key object in the target image is located. The weight determining module is further configured to: obtain a shadow factor of the second candidate illumination information storage block, the shadow factor being determined based on a proportion of a shadow area in the block area of the second candidate illumination information storage block; and determine a storage block weight of the second candidate illumination information storage block based on the shadow factor.

In some embodiments, the illumination information storage block is a volumetric lightmap block, and the volumetric lightmap block includes a plurality of light probes. The illumination information loading apparatus is further configured to: determine, from a plurality of loaded volumetric lightmap blocks, a loaded volumetric lightmap block adjacent to each pixel point in the target image, the plurality of loaded volumetric lightmap blocks including the loaded illumination information storage block; determine, from the loaded volumetric lightmap block corresponding to each pixel point, a light probe adjacent to each pixel point; and determine illumination information of each pixel point by using the light probe adjacent to each pixel point, and perform illumination calculation based on the illumination information of each pixel point to perform rendering, so as to obtain the target image.

All or part of the modules in the foregoing illumination information loading apparatus may be implemented through software, hardware, or a combination thereof. The foregoing modules may be embedded in hardware form or independent of a processor in a computer device, or may be stored in software form in a memory in the computer device, so that the processor may be called to perform operations corresponding to the foregoing modules.

Figure 12:
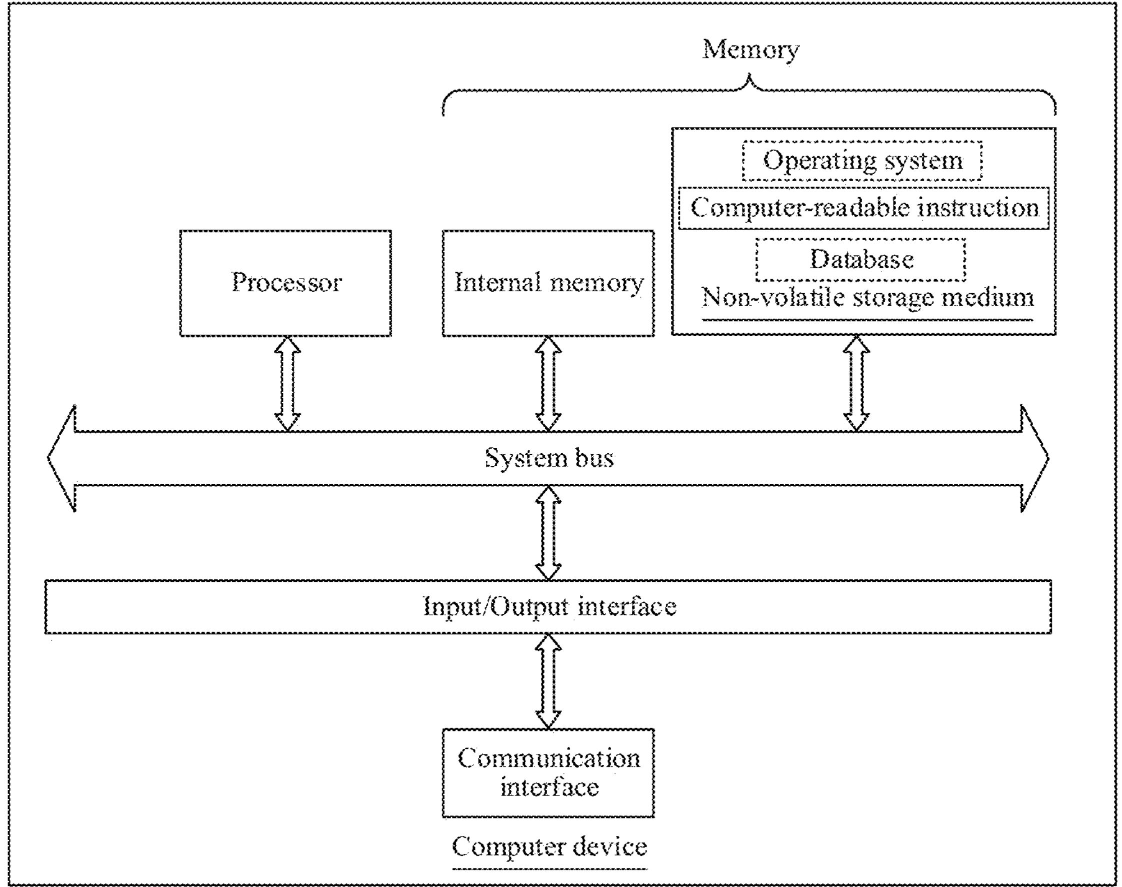
FIG. 12 is a diagram of an internal structure of a computer device according to some embodiments.

In some embodiments, a computer device is provided. The computer device may be a server, and a diagram of an internal structure of the computer device may be as shown in FIG. 12. The computer device includes a processor, a memory, an input/output interface (I/O for short), and a communication interface. The processor, the memory, and the input/output interface are connected via a system bus. The communication interface is connected to the system bus via the input/output interface. The processor of the computer device is configured to provide a computation and control capability. The memory of the computer device includes a non-transitory storage medium and an internal memory. The non-transitory storage medium has an operating system, computer-readable instructions, and a database stored thereon. The internal memory provides a running environment for the operating system and the computer-readable instructions on the non-transitory storage medium. The database of the computer device is configured to store data in an illumination information loading method. The input/output interface of the computer device is configured for information exchange between the processor and an external device. The communication interface of the computer device is configured to communicate with an external terminal via a network. The computer-readable instructions, when executed by the processor, implement an illumination information loading method.

Figure 13:
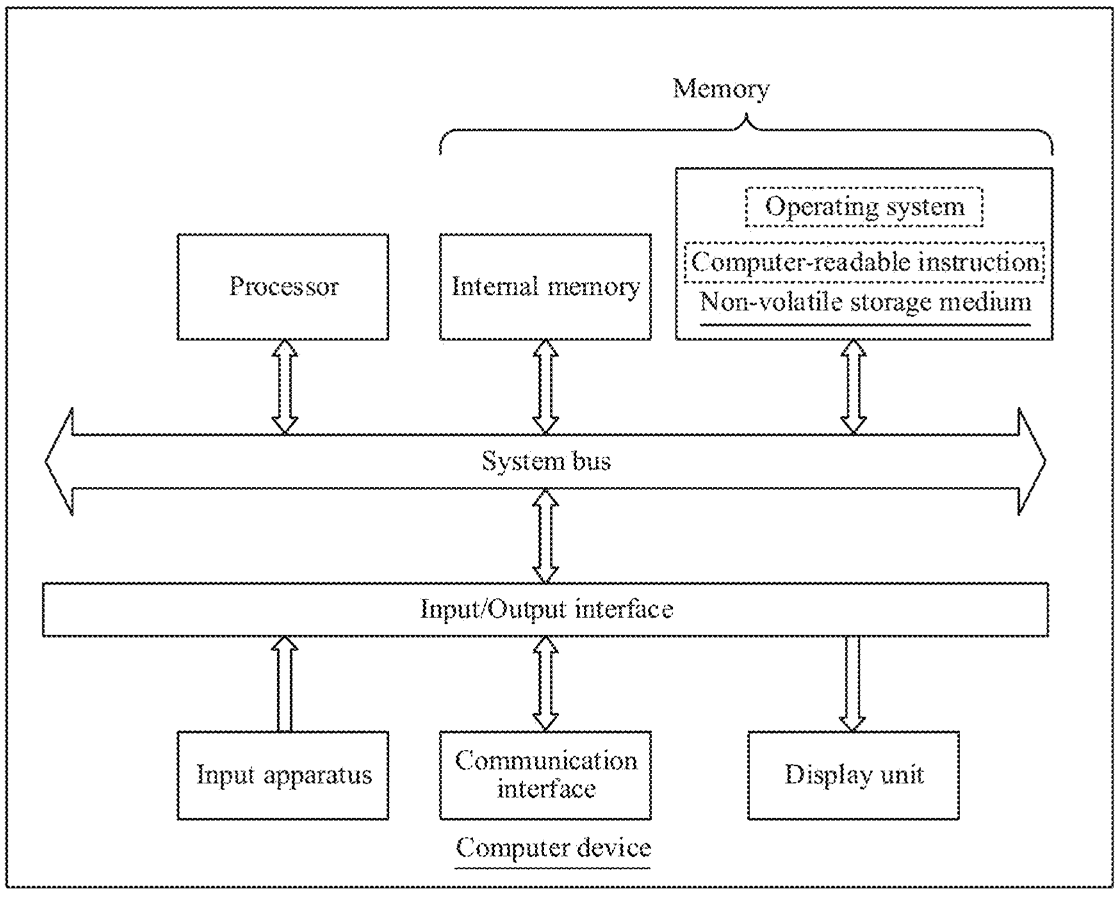
FIG. 13 is a diagram of an internal structure of a computer device according to some embodiments.

In some embodiments, a computer device is provided. The computer device may be a terminal, and a diagram of an internal structure of the computer device may be as shown in FIG. 13. The computer device includes a processor, a memory, an input/output interface, a communication interface, a display unit, and an input apparatus. The processor, the memory, and the input/output interface are connected via a system bus. The communication interface, the display unit, and the input apparatus are connected to the system bus via the input/output interface. The processor of the computer device is configured to provide a computation and control capability. The memory of the computer device includes a non-transitory storage medium and an internal memory. The non-transitory storage medium has an operating system and computer-readable instructions stored thereon. The internal memory provides a running environment for the operating system and the computer-readable instructions on the non-transitory storage medium. The input/output interface of the computer device is configured for information exchange between the processor and an external device. The communication interface of the computer device is configured for communication with an external terminal in a wired or wireless manner. The wireless manner may be implemented by using Wi-Fi, a mobile cellular network, near field communication (NFC), or another technology. The computer-readable instructions, when executed by the processor, implement an illumination information loading method. The display unit of the computer device is configured to form a visually visible picture, and may be a display screen, a projection apparatus, or a virtual reality imaging apparatus. The display screen may be a liquid crystal display or an e-ink display screen. The input apparatus of the computer device may be a touch layer covering the display screen, may be a button, a trackball, or a touchpad disposed on a housing of the computer device, or may be an external keyboard, touchpad, mouse, or the like.

A person skilled in the art may understand that the structures shown in FIG. 12 and FIG. 13 are merely block diagrams of partial structures related to a solution in this application, and do not constitute a limitation to the computer device to which the solution in this application is applied. Specifically, the computer device may include more or fewer components than those shown in the figures, or have some components combined, or have a different component deployment.

In some embodiments, a computer device is provided, including a memory and one or more processors. The memory has computer-readable instructions stored therein. The computer-readable instructions, when executed by the processor, enable the one or more processors to perform operations in the foregoing illumination information loading method.

In some embodiments, one or more non-transitory readable storage media are provided. The non-transitory readable storage medium has computer-readable instructions stored thereon. The computer-readable instructions, when executed by one or more processors, enable the one or more processors to implement operations in the foregoing illumination information loading method.

In some embodiments, a computer program product is provided, including computer-readable instructions. The computer-readable instructions, when executed by a processor, implement the operations in the foregoing illumination information loading method.

User information (including but not limited to user device information, user personal information, and the like) and data (including but not limited to data for analysis, stored data, displayed data, and the like) included in this application are information and data that all authorized by a user or fully authorized by all parties. Collection, use, and processing of related data need to comply with relevant laws, regulations, and standards of relevant countries and regions.

A person of ordinary skill in the art may understand that all or some of procedures of the method in the foregoing embodiments may be implemented by computer-readable instructions instructing relevant hardware. The computer-readable instructions may be stored on a non-transitory computer-readable storage medium. When the computer-readable instructions are executed, the procedures of embodiments of the foregoing methods may be implemented. References to the memory, the database, or another medium used in embodiments provided in this application may all include at least one of a non-transitory or a volatile memory. The non-transitory memory may include a read-only memory (ROM), a magnetic tape, a floppy disk, a flash memory, an optical memory, a high-density embedded non-transitory memory, a resistive random access memory (ReRAM), a magnetoresistive random access memory (MRAM), a ferroelectric random access memory (FRAM), a phase change memory (PCM), a grapheme memory, and the like. The volatile memory may include a random access memory (RAM), an external cache, or the like. As an illustration and not a limitation, the RAM may be in various forms, for example, a static random access memory (SRAM) or a dynamic random access memory (DRAM). The databases in embodiments of this application may include at least one of a relational database or a non-relational database. The non-relational database may include a blockchain-based distributed database and the like, which is not limited thereto. The processor in embodiments provided in this application may be a general-purpose processor, a central processing unit, a graphics processing unit, a digital signal processor, a programmable logic device, a quantum computing-based data processing logic device, and the like, which is not limited thereto.

Technical features of the foregoing embodiments may be randomly combined. To make description concise, not all possible combinations of the technical features in the foregoing embodiments are described. However, the combinations of these technical features shall be considered as falling within the scope recorded by this specification provided that no conflict exists.

The foregoing embodiments merely show several implementations of this application. The descriptions thereof are described in detail, but shall not be understood as limitations to the scope of this application. For a person of ordinary skill in the art, several transformations and improvements can be made without departing from the idea of this application. These transformations and improvements belong to the scope of protection of this application. Therefore, the protection scope of this application shall be subject to the appended claims.

What is claimed is:

1. A method for rendering an image performed by a computer device, the method comprising:

determining at least one candidate illumination information storage block associated with a target image, wherein the target image is a current video frame of a video and the at least one candidate illumination information storage block comprises a first candidate illumination information storage block adjacent to at least one pixel point in the target image;

determining a storage block weight corresponding to the at least one candidate illumination information storage block, further including:

determining a depth value of each adjacent pixel point in a previous video frame of the current video frame, wherein the depth value is a distance of the pixel point from a camera in a three-dimensional world space;

determine a pixel block weight of the first candidate illumination information storage block at each adjacent pixel point in the previous video frame of the current video frame based on the depth value of the adjacent pixel point in the previous video frame of the current video frame; and obtaining a storage block weight of the first candidate illumination information storage block from the pixel block weight of the first candidate illumination information storage block;

determining a target illumination information storage block from the at least one candidate illumination information storage block based on the storage block weight of the first candidate illumination information storage block; and performing illumination calculation by loading the target illumination information storage block to render the target image.

2. The method according to claim 1, wherein the determining at least one candidate illumination information storage block comprises:

determining, from a plurality of preset illumination information storage blocks, first illumination information storage blocks respectively adjacent to a plurality of pixel points in the target image; and performing deduplication processing based on the first illumination information storage blocks to obtain an associated illumination information storage block of the target image as the at least one candidate illumination information storage block.

3. The method according to claim 2, wherein the determining, from a plurality of preset illumination information storage blocks, first illumination information storage blocks respectively adjacent to a plurality of pixel points in the target image comprises:

obtaining block indexes respectively corresponding to a plurality of index data points, the block indexes being in one-to-one correspondence to the preset illumination information storage blocks;

selecting, for a pixel point among the plurality of pixel points, a block index corresponding to an index data point adjacent to the pixel point from the block indexes respectively corresponding to the plurality of index data points to obtain a target block index corresponding to the pixel point; and determining a preset illumination information storage block corresponding to the target block index as a first illumination information storage block adjacent to the pixel point.

4. The method according to claim 2, wherein the performing deduplication processing based on the first illumination information storage blocks to obtain an associated illumination information storage block of the target image as the at least one candidate illumination information storage block comprises:

selecting a second illumination information storage block adjacent to a key object in the target image from the plurality of preset illumination information storage blocks; and performing deduplication processing based on the first illumination information storage blocks and the second illumination information storage block to obtain the associated illumination information storage block of the target image.

5. The method according to claim 1, wherein the at least one candidate illumination information storage block comprises a second candidate illumination information storage block, a block area of the second candidate illumination information storage block is adjacent to a key object area, and the key object area is an area in which a key object in the target image is located; and the determining a storage block weight corresponding to the at least one candidate illumination information storage block comprises:

obtaining a shadow factor of the second candidate illumination information storage block, the shadow factor being determined based on a proportion of a shadow area in the block area of the second candidate illumination information storage block; and determining a storage block weight of the second candidate illumination information storage block based on the shadow factor.

6. The method according to claim 1, wherein the illumination information storage block is a volumetric lightmap block, and the volumetric lightmap block comprises a plurality of light probes; and the method further comprises:

determining, from a plurality of loaded volumetric lightmap blocks, a loaded volumetric lightmap block adjacent to each pixel point in the target image, the plurality of loaded volumetric lightmap blocks comprising the loaded illumination information storage block;

determining, from the loaded volumetric lightmap block corresponding to each pixel point, a light probe adjacent to each pixel point;

determining illumination information of each pixel point by using the light probe adjacent to each pixel point; and performing illumination calculation based on the illumination information of each pixel point to perform rendering to render the target image.

7. A computer device, comprising a memory and one or more processors, the memory having computer-readable instructions stored therein, and the computer-readable instructions, when executed by the processor, causing the computer device to perform a method for rendering an image including:

determining at least one candidate illumination information storage block associated with a target image, wherein the target image is a current video frame of a video and the at least one candidate illumination information storage block comprises a first candidate illumination information storage block adjacent to at least one pixel point in the target image;

determining a storage block weight corresponding to the at least one candidate illumination information storage block, further including:

determining a depth value of each adjacent pixel point in a previous video frame of the current video frame, wherein the depth value is a distance of the pixel point from a camera in a three-dimensional world space;

determine a pixel block weight of the first candidate illumination information storage block at each adjacent pixel point in the previous video frame of the current video frame based on the depth value of the adjacent pixel point in the previous video frame of the current video frame; and obtaining a storage block weight of the first candidate illumination information storage block from the pixel block weight of the first candidate illumination information storage block;

determining a target illumination information storage block from the at least one candidate illumination information storage block based on the storage block weight of the first candidate illumination information storage block; and performing illumination calculation by loading the target illumination information storage block to render the target image.

8. The computer device according to claim 7, wherein the determining at least one candidate illumination information storage block comprises:

determining, from a plurality of preset illumination information storage blocks, first illumination information storage blocks respectively adjacent to a plurality of pixel points in the target image; and performing deduplication processing based on the first illumination information storage blocks to obtain an associated illumination information storage block of the target image as the at least one candidate illumination information storage block.

9. The computer device according to claim 8, wherein the determining, from a plurality of preset illumination information storage blocks, first illumination information storage blocks respectively adjacent to a plurality of pixel points in the target image comprises:

obtaining block indexes respectively corresponding to a plurality of index data points, the block indexes being in one-to-one correspondence to the preset illumination information storage blocks;

selecting, for a pixel point among the plurality of pixel points, a block index corresponding to an index data point adjacent to the pixel point from the block indexes respectively corresponding to the plurality of index data points to obtain a target block index corresponding to the pixel point; and determining a preset illumination information storage block corresponding to the target block index as a first illumination information storage block adjacent to the pixel point.

10. The computer device according to claim 8, wherein the performing deduplication processing based on the first illumination information storage blocks to obtain an associated illumination information storage block of the target image as the at least one candidate illumination information storage block comprises:

selecting a second illumination information storage block adjacent to a key object in the target image from the plurality of preset illumination information storage blocks; and performing deduplication processing based on the first illumination information storage blocks and the second illumination information storage block to obtain the associated illumination information storage block of the target image.

11. The computer device according to claim 7, wherein the at least one candidate illumination information storage block comprises a second candidate illumination information storage block, a block area of the second candidate illumination information storage block is adjacent to a key object area, and the key object area is an area in which a key object in the target image is located; and the determining a storage block weight corresponding to the at least one candidate illumination information storage block comprises:

obtaining a shadow factor of the second candidate illumination information storage block, the shadow factor being determined based on a proportion of a shadow area in the block area of the second candidate illumination information storage block; and determining a storage block weight of the second candidate illumination information storage block based on the shadow factor.

12. The computer device according to claim 7, wherein the illumination information storage block is a volumetric lightmap block, and the volumetric lightmap block comprises a plurality of light probes; and the method further comprises:

determining, from a plurality of loaded volumetric lightmap blocks, a loaded volumetric lightmap block adjacent to each pixel point in the target image, the plurality of loaded volumetric lightmap blocks comprising the loaded illumination information storage block;

determining, from the loaded volumetric lightmap block corresponding to each pixel point, a light probe adjacent to each pixel point;

determining illumination information of each pixel point by using the light probe adjacent to each pixel point; and performing illumination calculation based on the illumination information of each pixel point to perform rendering to render the target image.

13. One or more non-transitory readable storage media, having computer-readable instructions stored thereon, the computer-readable instructions, when executed by one or more processors of a computer device, causing the computer device to perform a method for rendering an image including:

determining at least one candidate illumination information storage block associated with a target image, wherein the target image is a current video frame of a video and the at least one candidate illumination information storage block comprises a first candidate illumination information storage block adjacent to at least one pixel point in the target image;

determining a storage block weight corresponding to the at least one candidate illumination information storage block, further including:

determining a depth value of each adjacent pixel point in a previous video frame of the current video frame, wherein the depth value is a distance of the pixel point from a camera in a three-dimensional world space;

determine a pixel block weight of the first candidate illumination information storage block at each adjacent pixel point in the previous video frame of the current video frame based on the depth value of the adjacent pixel point in the previous video frame of the current video frame; and obtaining a storage block weight of the first candidate illumination information storage block from the pixel block weight of the first candidate illumination information storage block;

determining a target illumination information storage block from the at least one candidate illumination information storage block based on the storage block weight of the first candidate illumination information storage block; and performing illumination calculation by loading the target illumination information storage block to render the target image.

14. The non-transitory readable storage media according to claim 13, wherein the determining at least one candidate illumination information storage block comprises:

determining, from a plurality of preset illumination information storage blocks, first illumination information storage blocks respectively adjacent to a plurality of pixel points in the target image; and performing deduplication processing based on the first illumination information storage blocks to obtain an associated illumination information storage block of the target image as the at least one candidate illumination information storage block.

15. The non-transitory readable storage media according to claim 14, wherein the determining, from a plurality of preset illumination information storage blocks, first illumination information storage blocks respectively adjacent to a plurality of pixel points in the target image comprises:

obtaining block indexes respectively corresponding to a plurality of index data points, the block indexes being in one-to-one correspondence to the preset illumination information storage blocks;

selecting, for a pixel point among the plurality of pixel points, a block index corresponding to an index data point adjacent to the pixel point from the block indexes respectively corresponding to the plurality of index data points to obtain a target block index corresponding to the pixel point; and determining a preset illumination information storage block corresponding to the target block index as a first illumination information storage block adjacent to the pixel point.

16. The non-transitory readable storage media according to claim 13, wherein the at least one candidate illumination information storage block comprises a second candidate illumination information storage block, a block area of the second candidate illumination information storage block is adjacent to a key object area, and the key object area is an area in which a key object in the target image is located; and the determining a storage block weight corresponding to the at least one candidate illumination information storage block comprises:

obtaining a shadow factor of the second candidate illumination information storage block, the shadow factor being determined based on a proportion of a shadow area in the block area of the second candidate illumination information storage block; and determining a storage block weight of the second candidate illumination information storage block based on the shadow factor.

17. The non-transitory readable storage media according to claim 13, wherein the illumination information storage block is a volumetric lightmap block, and the volumetric lightmap block comprises a plurality of light probes; and the method further comprises:

determining, from a plurality of loaded volumetric lightmap blocks, a loaded volumetric lightmap block adjacent to each pixel point in the target image, the plurality of loaded volumetric lightmap blocks comprising the loaded illumination information storage block;

determining, from the loaded volumetric lightmap block corresponding to each pixel point, a light probe adjacent to each pixel point;

determining illumination information of each pixel point by using the light probe adjacent to each pixel point; and performing illumination calculation based on the illumination information of each pixel point to perform rendering to render the target image.

* * * * *